US011926959B2

(12) United States Patent
Wagner et al.

(10) Patent No.: US 11,926,959 B2
(45) Date of Patent: Mar. 12, 2024

(54) HIGH TENACITY TEXTILES CONTAINING SHEAR THICKENING FLUID AND USES THEREOF

(71) Applicant: STF Technologies, LLC, Newark, DE (US)

(72) Inventors: Norman J. Wagner, Newark, DE (US); Richard Dombrowski, Lutherville, MD (US)

(73) Assignee: STF Technologies, LLC, Newark, DE (US)

( * ) Notice: Subject to any disclaimer, the term of this patent is extended or adjusted under 35 U.S.C. 154(b) by 413 days.

(21) Appl. No.: 17/258,281

(22) PCT Filed: Jul. 3, 2019

(86) PCT No.: PCT/US2019/040541
§ 371 (c)(1),
(2) Date: Jan. 6, 2021

(87) PCT Pub. No.: WO2020/010224
PCT Pub. Date: Jan. 9, 2020

(65) Prior Publication Data
US 2021/0140099 A1    May 13, 2021

Related U.S. Application Data

(60) Provisional application No. 62/694,837, filed on Jul. 6, 2018.

(51) Int. Cl.
*D06M 15/53*     (2006.01)
*B32B 5/26*      (2006.01)
(Continued)

(52) U.S. Cl.
CPC ............... *D06M 15/53* (2013.01); *B32B 5/26* (2013.01); *B64G 6/00* (2013.01); *D06M 11/46* (2013.01);
(Continued)

(58) Field of Classification Search
CPC ...... D06M 15/53; D06M 11/46; D06M 11/74; D06M 11/76; D06M 11/83; D06M 17/00;
(Continued)

(56) References Cited

U.S. PATENT DOCUMENTS 3,751,727 A    8/1973   Shepard et al.
4,739,007 A    4/1988   Okada et al.
(Continued)

FOREIGN PATENT DOCUMENTS

EP    3 330 081 A1    6/2018
EP    3 384 790 A1    10/2018
(Continued)

OTHER PUBLICATIONS

Asija, "Impact response of shear thickening fluid (STF) treated ultra high molecular weight poly ethylene composites—study of the effect of STF treatment method" Thin-Walled Structures 126:16-25 (2017).
(Continued)

*Primary Examiner* — Matthew D Matzek
(74) *Attorney, Agent, or Firm* — Potter Anderson & Corroon LLP

(57) ABSTRACT

Textiles intercalated with shear thickening fluids (STF) are disclosed. The STF-intercalated textiles are light weight and include high tenacity textiles that exhibit enhanced resistance to puncture, cutting, abrasion, dust penetration, and projectile penetration. Also disclosed are multi-layer articles, such as safety suits and extra-vehicular mobility (Continued)

units, which include STF-intercalated textiles. Methods for manufacturing STF-intercalated textiles are also disclosed.

25 Claims, 18 Drawing Sheets

(51) Int. Cl.
  *B64G 6/00* (2006.01)
  *D06M 11/46* (2006.01)
  *D06M 11/74* (2006.01)
  *D06M 11/76* (2006.01)
  *D06M 11/83* (2006.01)
  *D06M 17/00* (2006.01)

(52) U.S. Cl.
  CPC ............ *D06M 11/74* (2013.01); *D06M 11/76* (2013.01); *D06M 11/83* (2013.01); *D06M 17/00* (2013.01); *B32B 2255/02* (2013.01); *B32B 2255/26* (2013.01); *B32B 2260/023* (2013.01); *B32B 2260/046* (2013.01); *B32B 2262/02* (2013.01); *B32B 2264/102* (2013.01); *B32B 2264/104* (2013.01); *B32B 2264/105* (2013.01); *B32B 2307/56* (2013.01); *B32B 2307/581* (2013.01); *B32B 2307/73* (2013.01); *D06M 2200/12* (2013.01)

(58) Field of Classification Search
  CPC .. D06M 2200/12; D06M 11/79; D06M 23/08; B32B 5/26; B32B 2255/02; B32B 2255/26; B32B 2260/023; B32B 2260/046; B32B 2262/02; B32B 2264/102; B32B 2264/104; B32B 2264/105; B32B 2307/56; B32B 2307/581; B32B 2307/73; B32B 2255/00; B32B 2262/0253; B32B 2262/0269; B32B 2262/0276; B32B 2264/108; B32B 2307/54; B32B 2307/558; B32B 2307/718; B32B 2571/02; B64G 6/00; B64G 1/56
  USPC ................................................. 442/134, 135
  See application file for complete search history.

(56) References Cited

U.S. PATENT DOCUMENTS

| | | | |
|---|---|---|---|
| 6,218,344 B1 * | 4/2001 | Gschwender | ........ C10M 105/02 508/591 |
| 7,226,878 B2 | 6/2007 | Wagner et al. | |
| 7,498,276 B2 | 3/2009 | Wagner et al. | |
| 7,825,045 B1 | 11/2010 | Wagner et al. | |
| 8,404,162 B2 | 3/2013 | Okoli et al. | |
| 2013/0061739 A1 * | 3/2013 | Cheong | ................. F41H 5/0485 428/317.1 |

FOREIGN PATENT DOCUMENTS

| | | |
|---|---|---|
| KR | 2015 0107987 A | 9/2015 |
| WO | WO 2011/099936 A1 | 8/2011 |
| WO | WO 2020/018539 A1 | 1/2020 |

OTHER PUBLICATIONS

Braza, "Lubricated Bearing Lifetimes of Multiply Alkylated Cyclopentane and a Linear Perfluoropolyether Fluid in Oscillatory Motion at Elevated Temperatures in Ultrahigh Vacuum" NASA/CR-2009-215637, p. 1-5 (2009).
Gon, "Complex Garment Systems to Survive in Outer Space" Textiles 7(2):1-25 (2011).
Jones, "Properties of Perfluoropolyethers for Space Applications" NASA Technical Memorandum 106616 for ASME/STLE Tribology Conference, Lahaina, Hawaii (Oct. 1994).
Lee, "The ballistic impact characteristics of Kevlar woven fabrics impregnated with a colloidal shear thickening fluid" J Materials Science 38:2825-2833 (2003).
Materials Data Book, Cambridge University Engineering Department, 2003 Edition.
Minus, "The Processing, Properties, and Structure of Carbon Fibers" JOM p. 52-58 (Feb. 2005).
Nam, "Ballistic and Rheological Properties of STFs Reinforced by short Discontinuous Fibers" Proceedings of the Society for the Advancement of Material and Process Engineering Conference, Long Beach California, May 1-5, 2004.
Nettles, "Permeability After Impact Testing of Composite Laminates" NASA, Marshall Space Flight Center Research Paper, p. 1-14 (2018).
O'Connor, "Lotus Coating. Mitigating Surface Contamination" Presentation at Goddard Space Flight Center, NASA Tech Briefs Webinar (Sep. 22, 2015).
Park, "Modifying a silicone potting compound for space flight applications" Abstract, NASA Technical Report 19830039241 (1982).
Rheopecty, Wikipedia, the free encyclopedia, XP002794974 (Jun. 4, 2017) (available at https://en.wikipedia.org/w/index.php?title=Rheopecty&oldid=783741589).
Ross, "Z-2 Prototype Space Suit Development" 44th International Conference on Environmental Systems July 13-17 Tucson Arizona, pp. 1-11 (2014).
"Silicon Compounds to Succinic and Succinic Anhydride. Size Measurement of Particles" in Kirk-Othmer, Encyclopedia of Chemical technology, 4th Ed vol. 22 pp. 256-276 (Wiley & Sons ed. 1997).
Sloan, "Composites in the Martian Suit" Composite World available at https://www.compositesworld.com/articles/composites-in-the-space-suit-for-mars (2016).
Tan, "Strengthening fabric armour with silica colloidal suspensions" Int. J. Solids and Structures 42(5-6):1561-1576 (2004).
Unnikrishnan, "Toughening of epoxy resins" Designed Monomers and Polymers 9(2):129-152 (2006).
Wilson, "How Liquid Body Armor Works" in HowStuffWorks Science, XP002794975 (Jul. 9, 2017) (available at https://web.archive.org/web/20170709113722/http://science.howstuffworks.com/liquid-body-armor1.htm).
International Search Report and Written Opinion in International Patent Application No. PCT/US2019/040541, dated Nov. 25, 2019.

* cited by examiner

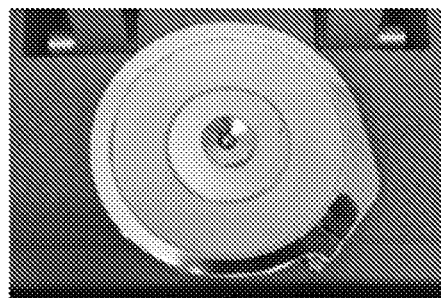

FIG. 5A

Simulant migration　　　　　　　　Gross damage

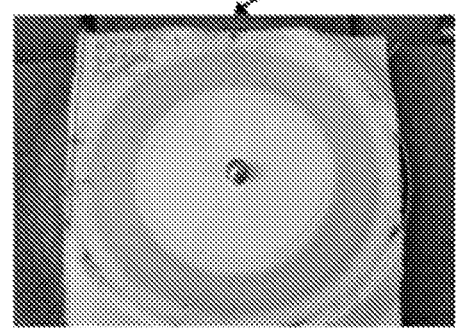　　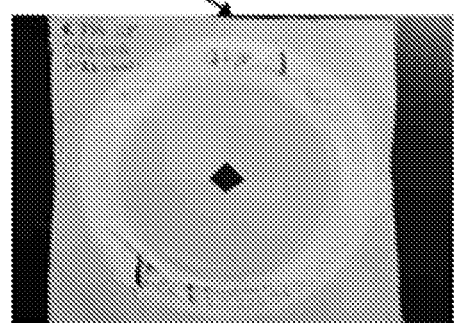

FIG. 5B　　　　　　　　FIG. 5C

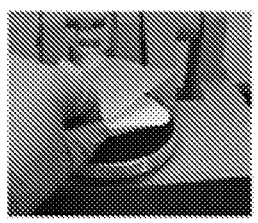 → 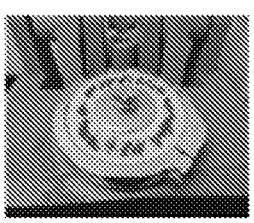 → 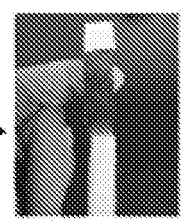 → 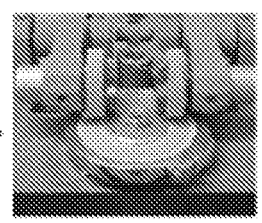

Place fabric sample over witness paper　　Clamp test specimen and load with 0.3g simulant　　Tape fabric strips to Taber CS-0 rubber wheels　　Engage wheels and rotate 10,000 cycles (72 rpm)

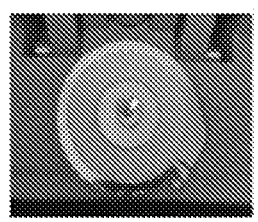 → 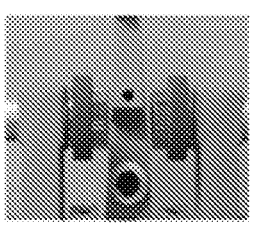 → 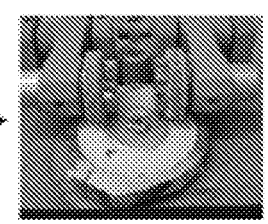

Clamp test specimen to testing platform　　Use Taber H-22 wheels (coarse)　　Engage wheels and rotate 855 cycles (72 rpm)

Note: vacuumed sample and wheels every 10,000 rotations to prevent forming protective layer

FIG. 6

HIGH TENACITY TEXTILES CONTAINING SHEAR THICKENING FLUID AND USES THEREOF

CROSS REFERENCE TO RELATED APPLICATIONS

This claims benefit of U.S. Provisional Application No. 62/694,837, filed Jul. 6, 2018, the entire contents of which are incorporated by reference herein.

GOVERNMENT SUPPORT

This invention was made with government support under Contract No. 80NSSC17C0025 awarded by the National Aeronautics and Space Administration. The government has certain rights in the invention.

FIELD OF THE INVENTION

The invention relates to shear thickening fluids (STF) to reinforce textiles utilized in hazardous environments. In particular, STF-intercalated fabrics can be used in safety apparel that protects the wearer from dust, sharp objects, and projectiles, such as safety apparel appropriate for the space environment.

BACKGROUND

The success of astronauts in performing extra-vehicular activity (EVA) is highly dependent on the performance of the environmental protection garments (EPG) they are wearing. Outer space is an extremely hostile environment with no atmosphere, extreme temperature, and various types of harmful radiation. Even in a low earth orbit, astronauts could be hit by small particles of dust or rock or orbiting spacecraft/satellite debris moving at very high speeds. Moreover, lunar or Martian exploration exposes the astronauts to worlds with little or no atmosphere and the added hazard of a potentially rocky surface with craters, hills, ravines, and the like, all of which are potentially unforgiving of any misstep taken by the astronaut. Indeed, such a misstep may result in damage to the astronaut's EPG thus exposing the astronaut to the extraterrestrial atmosphere, or lack thereof, resulting in near-instant death. Thus, it is vital that the EPGs are designed with adequate safety features.

Improving astronaut safety and survivability on extended duration missions will necessitate more durable EPGs that offer enhanced astronaut protection while being capable of withstanding extended exposure to the space environment and multiple EVAs. In contrast to Apollo-era EPGs that were required to perform for only a few days of use in total, new EPGs for exploration of Mars may need to function effectively for five hundred days or more and withstand harsher conditions, including the handling of sharp and rough rocks, tools, or other objects. Resistance to puncture/cut is an essential protective attribute of EVA suits that is not well-met by current materials. During EVAs on STS-116, STS-118, and STS-120 astronauts sustained puncture/cut damage to gloves due to small, sharp edges from micrometeoroid and orbital debris (MMOD) impacts on the International Space Station (ISS) handrails. Glove damage led to termination of the EVA in some cases. In response, gloves for subsequent missions were reinforced with additional patches to improve cut and puncture resistance, but these patches reduced glove mobility. However, because of inherent differences between spacewalks and surface operations, future missions will require that the entire EPG offers excellent puncture/cut protection. The current technological solution to the glove damage problem—the addition of more textile layers—can unacceptably increase stiffness and limit range of motion when applied to an entire suit. Thus, there remains a critical need for flexible, lightweight, puncture, and physical hazard protective materials for use in EPGs.

The Martian surface, or any other extraterrestrial surface for that matter, poses an additional problem—dust or regolith. Dust resistance is a major unmet need in EPG design and which deserves primary attention. Martian dust storms, for instance, may greatly increase the risk of dust contamination in EPGs thereby presenting a health hazard and possibly damaging life support equipment. Further, dust contamination can be carried back to a habitat or vehicle resulting in cross-contamination and damage to equipment. Astronauts can experience negative health consequences such as eye and mucous membrane irritation or respiratory problems from breathing dust that is brought into the habitat. Importantly, immediate medical attention and equipment repair is made more difficult, if not impossible, in outer space or on a Martian landscape.

Another important consideration that must be taken into account when designing EPGs for use in low-earth orbit, outer space, or on a lunar or extraterrestrial surface, is that the life support systems are closed circuit systems that are especially susceptible to gas contamination due to outgassing from the very same materials used to construct the EPG. Given the low pressure environments to which astronauts will be exposed, the propensity for materials to evaporate and produce outgassing is increased. Outgassing not only presents a health concern, but potentially poses a cross-contamination threat to life support systems and other equipment. Furthermore, outgassing from materials such as lubricants or textile coatings can degrade the intended functional performance of those materials. Thus, materials with high outgassing properties, which includes many types of lubricants and solvents used in the construction of textiles and other materials, are unsuitable for use in the EPGs.

One potential avenue to strengthen materials for use in EPGs is imparting shear thickening characteristics to durable fabric materials. Shear thickening is a non-Newtonian flow behavior of a fluid characterized by an increase in viscosity with an increase in shear strain. Most often, this behavior is observed in concentrated colloidal suspensions, which is due to the formation of "jamming clusters resulting from hydrodynamic lubrication forces between the particles" called "hydroclusters" (see Lee et al., 2003, J. Materials Sci. 38:2825-2833). Therefore, STF-coated or impregnated fabrics may exhibit enhanced impact resistance in response to MMODs, jagged work surfaces, and other hazards. U.S. Pat. No. 7,226,878 discloses the use of shear thickening fluids (STF) in body armor. While the "liquid body armor" was shown to exhibit enhanced ballistic resistance, current STF-fabrics lack the thermal stability and outgassing properties necessary for extra-vehicular mobility unit (EMU) wear for prolonged periods of time during a space walk or on a planetary surface (e.g., Mars).

Thus, there remains a need in the art for thermally stable, low volatility materials with enhanced resistant to dust contamination, cutting, abrasion, puncture, and MMOD penetration for use in EPGs.

SUMMARY OF THE INVENTION

The present invention provides textiles with increased resistance to puncture, cutting, abrasion, and/or dust penetration. In particular, a textile is provided into which a shear thickening fluid is intercalated to confer to the fabric increased resistance to puncture, cutting, abrasion, and/or dust penetration.

One aspect of the invention features a textile with increased resistance to puncture, cutting, abrasion, and/or dust penetration, the textile comprising: a fabric comprising a plurality of fibers and a shear thickening fluid comprising at least one low volatility carrier fluid in which is suspended particles having an average particle size of less than about 4,000 nm. In this aspect, the shear thickening fluid is intercalated into the fabric and confers to the fabric increased resistance to puncture, cutting, abrasion, and/or dust penetration as compared to an equivalent fabric that is not intercalated with shear thickening fluid. In some embodiments, the plurality of fibers have a tensile strength of at least about 250 MPa. In other embodiments, the plurality of fibers have a tensile strength of at least about 1 GPa and a specific strength of at least about 1,500 kN*m/kg. In yet other embodiments, the average particle size of the suspended particles is less than about 1,000 nm.

The shear thickening fluid can include particles are suspended in the low volatility carrier fluid at a concentration in the range from about 40% to about 85% by weight particles. In some embodiments, the particles are suspended in the low volatility carrier fluid at a concentration in the range from about 60% to about 70% by weight particles. The fibers of the textile fabric may be selected from the group consisting of aramid fibers, ultra-high molecular weight polyethylene fibers, expanded/stretched polytetrafluoroethylene fibers, polyethylene terephthalate fibers, fibers made from copolymers of paraphenylenediamine and diaminodiphenyl ether, aromatic polyester fibers produced by polycondensation of 4-hydroxybenzoic acid and 6-hydroxynapthalene-2-carboxylic acid, composite textiles, and any combination thereof. In some embodiments, the plurality of fibers comprise poly-(p-phenylene terephthalamide), poly-(m-phenylene isophthalamide), ultra-high molecular weight polyethylene fibers, aromatic polyester fibers produced by polycondensation of 4-hydroxybenzoic acid and 6-hydroxynapthalene-2-carboxylic acid, a three-beam weave with one surface of ePTFE interwoven into a second surface of poly-(m-phenylene isophthalamide) interlaced with a poly-(p-phenylene terephthalamide) lattice, or a two-beam weave with one surface of ePTFE interwoven into a second surface comprising aromatic polyester fibers produced by polycondensation of 4-hydroxybenzoic acid and 6-hydroxynapthalene-2-carboxylic acid. Additionally, these fibers may, in some embodiments, be ultra-high molecular weight polyethylene fibers.

In some embodiments, the particles may be oxides, calcium carbonate, synthetically occurring minerals, naturally occurring minerals, polymers, titanates, carbon particles, metallic particles, zeolites, or a mixture thereof. Moreover, the particles, e.g., may have an average particle size of between about 300 nm to about 700 nm and an aspect ratio of about 1:1 to about 10:1. In some embodiments, the particles are silica particles.

In some instances, the shear thickening fluid includes a low volatility carrier fluid that has a vapor pressure of less than about $1\times10^{-6}$ mPa at 25° C. where less than 2% mass is lost from the shear thickening fluid under a standard vacuum test according to ASTM standard 595 and/or NASA Standard 6001-B. For instance, the low volatility carrier fluid may be a hydrocarbon fluid, a fluorinated polyether, or a combination of a hydrocarbon fluid and fluorinated polyether. In some embodiments, the low volatility carrier fluid comprises a perfluoropolyether. In others, it comprises a multiply-alkylated cyclopentane.

In some embodiments, the shear thickening fluid increases the total weight of the textile by less than about 35% as compared to the fabric prior to intercalation of the shear thickening fluid. In other embodiments, the shear thickening fluid increases the total weight of the textile by less than about 20% as compared to the fabric prior to intercalation of the shear thickening fluid. For some textiles, the shear thickening fluid decreases the flexural rigidity of the textile by at least about 5% as compared to the fabric prior to intercalation of the shear thickening fluid.

The textile of the instant disclosure may include a superhydrophobic coating disposed on a surface of the fabric, wherein the superhydrophobic coating confers to the textile improved dust penetration resistance and/or adhesion as compared to the textile without the superhydrophobic coating.

In another aspect, provided herein is a multi-layer article comprising two or more layers in which at least one of the layers is the textile of any one of the preceding claims. In some embodiments, the multi-layer article comprising four or more layers. In other embodiments, at least two of the layers is the textile of any one of the preceding claims. The multi-layer article provided herein may be, for instance, a safety suit or turnout gear. In some embodiments, the safety suit or turnout gear is an extra-vehicular mobility unit, an environmental protection garment, a thermal micrometeoroid garment, firefighter turnout gear, a hazmat suit, or a fire proximity suit.

Another aspect of the invention features a multilayer article comprising at least one absorber layer for dissipating kinetic energy of a moving object where the absorber layer comprises a shear thickening fluid intercalated into a fabric. In such aspects, the shear thickening fluid comprises at least one low volatility carrier fluid in which is suspended particles at a concentration in the range from about 40% to about 85% by weight, and wherein the suspended particles and shear thickening fluid remain in a flowable form after intercalation. Additionally or alternatively, the fabric of the absorber layer may comprise a plurality of fibers having a tensile strength of at least about 250 MPa. In still other embodiments, the fibers have a tensile strength of at least about 1 GPa and a specific strength of at least about 1,500 kN*m/kg.

In some embodiments, the multilayer article features a plurality of layers at least two of which are absorber layers, wherein an interior absorber layer is disposed within the interior of the plurality of layers and wherein an outer absorber layer forms an exterior layer. Further, the multi-layer article may include a secondary interior absorber layer, wherein the interior absorber layer is disposed between the secondary interior absorber layer and the outer absorber layer. For some embodiments, the fabric of each of the interior absorber layer, the secondary interior absorber layer, and the outer absorber layer comprises a plurality of fibers selected from the group consisting of aramid fibers, ultra-high molecular weight polyethylene fibers, expanded/stretched polytetrafluoroethylene fibers, polyethylene terephthalate fibers, fibers made from copolymers of paraphenylenediamine and diaminodiphenyl ether, aromatic polyester fibers produced by polycondensation of 4-hydroxybenzoic acid and 6-hydroxynapthalene-2-carboxylic acid, orthofabric fibers, composite textiles, and any combination thereof. In others, the plurality of fibers are poly-(p-phenylene terephthalamide), poly-(m-phenylene isophthalamide), ultra-high molecular weight polyethylene fibers, aromatic polyester fibers produced by polycondensation of 4-hydroxybenzoic acid and 6-hydroxynapthalene-2-carboxylic acid, a three-beam weave with one surface of ePTFE interwoven into a second surface of poly-(m-phenylene isophthalamide) interlaced with a poly-(p-phenylene terephthalamide) lattice, or a two-beam weave with one surface of ePTFE interwoven into a second surface comprising aromatic polyester fibers produced by polycondensation of 4-hydroxybenzoic acid and 6-hydroxynapthalene-2-carboxylic acid.

In some embodiments, the multilayer article includes a plurality of fibers in the interior absorber layer, the secondary interior absorber layer, or both, that are ultra-high molecular weight polyethylene fibers. In another embodiment, the plurality of fibers of the outer absorber layer comprise a three-beam weave with one surface of ePTFE interwoven into a second surface of poly-(m-phenylene isophthalamide) interlaced with a poly-(p-phenylene terephthalamide) lattice.

In some embodiments, the shear thickening fluid of the multilayer article includes particles are oxides, calcium carbonate, synthetically occurring minerals, naturally occurring minerals, polymers, titanates, carbon particles, metallic particles, zeolites, or a mixture thereof, and wherein the particles have an average particle size of less than about 4,000 nm. In other embodiments, the average particle size is less than about 1,000 nm. These particles may, for example, have an average particle size of between about 300 nm to about 700 nm and an aspect ratio of about 1:1 to about 10:1. In one particular embodiment, the particles are silica particles. Moreover, the low volatility carrier fluid of the shear thickening fluid may be a hydrocarbon fluid, a fluorinated polyether, or a combination of a hydrocarbon fluid and fluorinated polyether. For instance, the low volatility carrier fluid may comprise a perfluoropolyether or a multiply-alkylated cyclopentane.

In one embodiment, the multilayer article comprises a superhydrophobic coating disposed on an exterior surface of the outer absorber layer which confers to the outer absorber layer improved dust penetration resistance as compared to an outer absorber layer without the superhydrophobic coating. In another embodiment, there may be one or more insulating layers disposed between the interior absorber layer and the outer absorber layer, and wherein the insulating layers comprise aluminized biaxially-oriented polyethylene terephthalate.

In another aspect, a thermal micrometeoroid garment is provided that includes a plurality of layers positioned between an interior and an external environment, where the plurality of layers comprise a restraint layer, an absorber layer, and an outer layer, where the restraint layer is disposed between the interior and the absorber layer, and where the outer layer is disposed between the absorber layer and the external environment. In such aspect, the absorber layer comprises a shear thickening fluid intercalated into a fabric, wherein the shear thickening fluid comprises at least one low volatility carrier fluid in which is suspended particles at a concentration in the range from about 40% to about 85% by weight, and wherein the suspended particles and shear thickening fluid remain in a flowable form after intercalation.

In another embodiment, the thermal micrometeoroid garment includes two or more insulating layers disposed between the absorber layer and the outer layer, wherein the two or more insulating layers comprise aluminized biaxially-oriented polyethylene terephthalate. The thermal micrometeoroid garment may also include, for example, one or more of the restraint layer, absorber layer, and an outer layer that comprise a fabric containing plurality of fibers having a tensile strength of at least about 250 MPa. In some embodiments, the fibers may have a tensile strength of at least about 1 GPa and a specific strength of at least about 1,500 kN*m/kg. These fibers may be poly-(p-phenylene terephthalamide) fibers, poly-(m-phenylene isophthalamide) fibers, ultra-high molecular weight polyethylene fibers, aromatic polyester fibers produced by polycondensation of 4-hydroxybenzoic acid and 6-hydroxynapthalene-2-carboxylic acid, a three-beam weave with one surface of ePTFE interwoven into a second surface of poly-(m-phenylene isophthalamide) interlaced with a poly-(p-phenylene terephthalamide) lattice, or a two-beam weave with one surface of ePTFE interwoven into a second surface comprising aromatic polyester fibers produced by polycondensation of 4-hydroxybenzoic acid and 6-hydroxynapthalene-2-carboxylic acid.

In other embodiments, the restraint layer, the outer layer, or both comprises a shear thickening fluid intercalated into the fabric, wherein the shear thickening fluid comprises at least one low volatility carrier fluid in which is suspended particles at a concentration in the range from about 40% to about 85% by weight, and wherein the suspended particles and shear thickening fluid remain in a flowable form after intercalation. In yet other embodiments, the low volatility carrier fluid has an absolute pressure of less than about $1 \times 10^{-6}$ mPa at 25° C., and wherein less than about 2% mass is lost from the shear thickening fluid under a standard vacuum test according to ASTM standard 595 and/or NASA Standard 6001-B. For instance, the low volatility carrier fluid may include a perfluoropolyether, a multiply-alkylated cyclopentane, or a combination of a perfluoropolyether and a multiply-alkylated cyclopentane.

In yet other embodiments, a superhydrophobic coating is disposed on an exterior surface of the outer layer, wherein the superhydrophobic coating confers to the outer layer improved dust penetration and/or adhesion resistance as compared to an outer layer without the superhydrophobic coating.

In other embodiments, a silicone coating is disposed on an exterior surface of the outer layer, wherein the silicone coating confers improved dust penetration and/or adhesion resistance compared to an outer layer without the silicone coating. In some embodiments volatile components are removed from the silicone using heat, vacuum, or a combination of the two. Further, particles may be added to the silicone coating to further increase the durability, impart desired color or optical properties, and/or reduce the adhesion of dust or regolith to the coated system. In some embodiments, the particles may be oxides, calcium carbonate, synthetically occurring minerals, naturally occurring minerals, polymers, titanates, carbon particles, metallic particles, zeolites, or a mixture thereof. Moreover, the particles, e.g., may have an average particle size of between about 300 nm to about 10 μm and an aspect ratio of about 1:1 to about 10:1. In some embodiments, the particles are poly(tetrafluoroethylene) particles, silica, or calcium carbonate.

These and other features, aspects, and advantages of the present invention will become better understood with regard to the following description, appended claims, and accompanying drawings.

BRIEF DESCRIPTION OF THE DRAWINGS

FIG. 5A is a picture of a test specimen secured to a Taber Abraser test platform prior to abrasion testing.

FIG. 5B is a picture of a test specimen following abrasion testing for simulant migration. Shown is the appearance of the test specimen after application of the JSC-Mars 1A regolith to the surface of the test specimen and engaging the test specimen with fabric covered Genuine Taber CS-0 wheels.

FIG. 5C is a picture of a test specimen following abrasion testing for coarse abrasion. Shown is the test specimen after application of the JSC-Mars 1A regolith to the surface of the test specimen and engagement of the test specimen with fabric covered Genuine Taber H-22 wheels.

FIG. 6 shows the abrasion test procedure for studying simulant migration (top) and coarse abrasion (bottom). For simulant migration, the fabric sample is placed over the white witness paper (top, left) and then clamped and loaded with 0.3 g JSC-Mars 1A regolith simulant (top, second from left). Fabric strips are taped to the Taber CS-0 wheels (top, second from right), which are then engaged and rotated at 72 rpm for 10,000 cycles. For coarse abrasion, the fabric sample is clamped to the testing platform (bottom, left). Taber H-22 wheels are engaged (bottom, middle) and rotated at 72 rpm for 855 cycles (bottom, right).

DETAILED DESCRIPTION OF THE INVENTION

Figure 1:
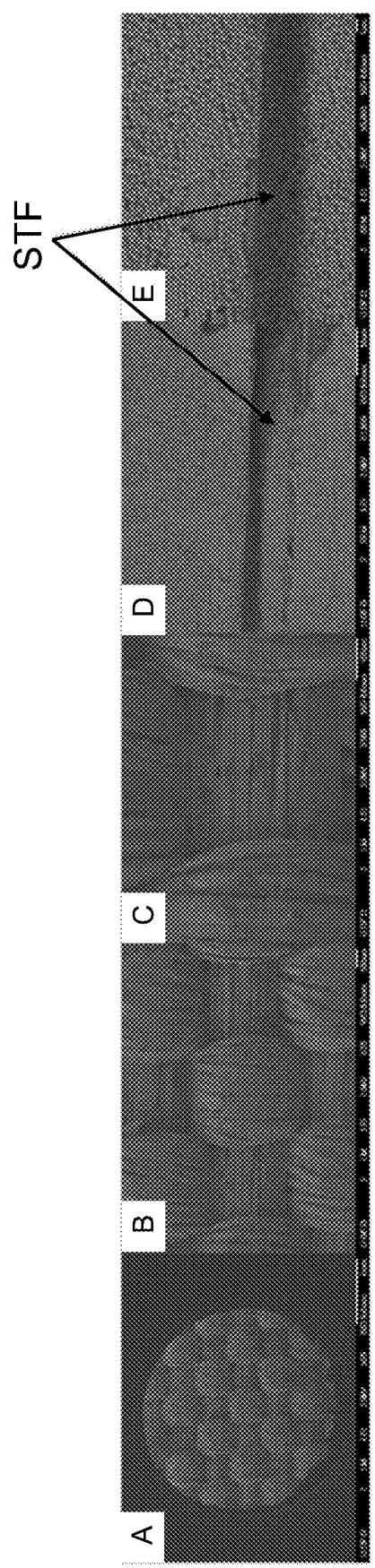
FIG. 1 is a Scanning Electron Micrograph of a woven Spectra® fabric with intercalated shear thickening fluid. The STF is primarily located between the fibers, as shown by the arrows, with a smaller amount of the STF located on the surface of fibers. The magnification is 25× (panel A), 75× (panel B), 160× (panel C), 1,800× (panel D), and 5,000 (panel E).

Described herein are textiles wherein intercalation of shear thickening fluid (STF) confers to the textile increased strength; resistance to puncture, cutting, abrasion; protection against projectiles (e.g., micrometeoroids and orbital debris; MMOD); and/or enhanced dust mitigation. In particular, STF is intercalated into fabrics with high tenacity fibers. In turn, these STF-intercalated fabrics exhibit these enhanced puncture, cutting, abrasion, penetration, and dust protection properties without the necessity for thick and heavy layers of material. As such, the materials disclosed herein are light weight and retain their flexibility. Moreover, the inventors have discovered that the use of certain low volatility solvents as the STF carrier fluid produces STF-intercalated fabrics with low outgassing properties. Accordingly, the STF-intercalated fabrics provided herein can be used in a variety of applications, including protective coverings, flame-resistance blankets, and safety equipment.

Also described herein are multi-layer articles that can be used as coverings or worn as an environmental protective garment (EPG). Incorporation of one or more of the STF-intercalated fabrics of the instant disclosure into these multi-layer articles enhances the article's ability to tolerate higher puncture and cutting forces as compared to more conventional EPGs. What is more, the multi-layer articles disclosed herein exhibit both reduced dust penetration as well as self-cleaning properties. As such, the STF-intercalated fabrics of the instant disclosure are ideal for use in construction of EPGs, such as firefighting apparel (i.e., turnout gear) and extra-vehicular mobility units (EMU) for use in space travel.

All percentages expressed herein are by weight of the total weight of the composition or mixture unless expressed otherwise. All ratios expressed herein are on a weight (w/w) basis unless expressed otherwise.

Ranges may be used herein in shorthand, to avoid having to list and describe each value within the range. Any appropriate value within the range can be selected, where appropriate, as the upper value, lower value, or the terminus of the range.

As used herein, the singular form of a word includes the plural, and vice versa, unless the context clearly dictates otherwise. Thus, the references "a", "an", and "the" are generally inclusive of the plurals of the respective terms. For example, reference to "a method" or "a fabric" includes a plurality of such "methods", or "fabrics." Likewise the terms "include", "including", and "or" should all be construed to be inclusive, unless such a construction is clearly prohibited from the context. Similarly, the term "examples," particularly when followed by a listing of terms, is merely exemplary and illustrative and should not be deemed exclusive or comprehensive.

The term "comprising" is intended to include embodiments encompassed by the terms "consisting essentially of" and "consisting of". Similarly, the term "consisting essentially of" is intended to include embodiments encompassed by the term "consisting of."

The methods and compositions and other advances disclosed herein are not limited to particular equipment or processes described herein because such equipment or processes may vary. Further, the terminology used herein is for describing particular embodiments only and is not intended to limit the scope of that which is disclosed or claimed.

Unless defined otherwise, all technical and scientific terms, terms of art, and acronyms used herein have the meanings commonly understood by one of ordinary skill in the art in the field(s) of the invention, or in the field(s) where the term is used. Although any compositions, methods, articles of manufacture, or other means or materials similar or equivalent to those described herein can be used in the practice of the present invention, the preferred compositions, methods, articles of manufacture, or other means or materials are described herein.

The term "about" refers to the variation in the numerical value of a measurement, e.g., temperature, length, width, height, weight percentage, etc., due to typical error rates of the device used to obtain that measure. In one embodiment, the term "about" means within 5% of the reported numerical value.

The term "areal density" as used herein refers to the weight of a textile divided by the area measured in grams per square meter. "Areal density" is an indication of the energy absorption capability of the material.

The terms "Environmental Protection Garment" and "EPG" are used interchangeable herein to refer to apparel worn to protect the wearer against harmful environmental conditions. EPGs include EMUs and TMGs.

The terms "Extravehicular Activity" and "EVA" are used interchangeable herein to refer to any activity done by an astronaut outside a spacecraft beyond Earth's appreciable atmosphere, including, but not limited to, space walks, moonwalks, or operations on extraterrestrial landscapes (e.g., Mars).

The terms "Extravehicular Mobility Unit" and "EMU" are used interchangeable herein to refer to an independent anthropomorphic spacesuit that provides environmental protection, mobility, life support, and communications for astronauts performing extravehicular activity and consists of a hard upper torso assembly, arm garment sections and gloves, a life support system, a helmet, and a soft lower torso assembly.

The terms "fabric" and "textile" are used interchangeable herein to refer to a sheet-like structure comprised of fibers or yarns made of fibers. "Engineering fabrics" or "Engineering textiles" are used herein to refer to fabrics made from durable fibers or, in some cases, high tenacity fibers.

The term "flexural rigidity" means the force required to bend a non-rigid structure in one unit of curvature and/or the resistance offered by the structure while undergoing bending. The term "flexural rigidity" also refers to the resistance offered by a structure while undergoing bending.

The term "high tenacity fabric" is used herein to refer to a fabric comprised of high tenacity fibers.

The term "high tenacity fiber" is used herein to refer to a fiber having a tensile strength of at least about 250 MPa.

The terms "intercalated", "intercalation", "intercalating", "intercalate" as used herein to refer to STF treatment of a fabric means that the STF fluid is inserted into the fabric and between the fibers and within the yarns. STF "intercalation" not only fills the any gaps or holes between the fibers in the weave, but coats the individual fibers themselves.

The term "load" as used herein refers to a structural load or force applied to a structure or textile.

The terms "Micrometeoroids and Orbital Debris" or "MMOD" are used interchangeably herein and refer to naturally occurring micrometeoroids and man-made debris that orbit the Earth and travel at average speeds of 22,000 miles per hour.

The term "orthofabric" as used herein refers to a blended weave of distinct fibers, such as a three-beam weave of ePTFE, poly-(p-phenylene terphthalamide) (e.g., KEVLAR), and poly-(m-phenylene isophthalamide) (e.g., NOMEX).

The term "outgassing" as used herein refers to the release of gas that was dissolved, trapped, frozen, or absorbed in some material. "Outgassing" can include sublimation, evaporation, desorption, and gas products of slow chemical reactions. Outgassing can be increased due to increasing temperature and/or decreasing pressure.

The term "regolith" as used herein refers to a layer of loose, heterogeneous deposits covering rocks and includes, but is not limited to, dust, soil, broken rock, and other related materials. "Regolith" is present on the Earth, Mars, some asteroids, and other terrestrial planets and moons.

The term "specific strength" as used herein refers to the strength of a material divided by its density. For fibers or textiles, tenacity is the typical measure of specific strength.

The term "tensile strength" as used herein refers to the capacity of a material to withstand loads tending to elongate the material.

The terms "thermal micrometeoroid garment" and "TMG" are used interchangeably herein and refer to the outer layers of a space suit. The TMG serves to insulate the suit occupant and prevent heat loss, to shield the occupant from harmful solar radiation, and to product the occupant from MMOD, which could puncture the suit and depressurize it.

The term "turnout gear" means personal protective equipment including coats, pants, flash hoods, overalls, gloves, etc.

The term "vapor pressure" means the pressure exerted by a vapor in thermodynamic equilibrium with its condensed phases at a given temperature in a closed system. A substance with a high vapor pressure at normal temperatures may be referred to as "volatile."

All patents, patent applications, publications, technical and/or scholarly articles, and other references cited or referred to herein are in their entirety incorporated herein by reference to the extent allowed by law. The discussion of those references is intended merely to summarize the assertions made therein. No admission is made that any such patents, patent applications, publications or references, or any portion thereof, are relevant, material, or prior art. The right to challenge the accuracy and pertinence of any assertion of such patents, patent applications, publications, and other references as relevant, material, or prior art is specifically reserved.

Provided herein are fabrics and other materials treated with STF fluid. It is preferred that the STF fluid is intercalated into the material. As one having ordinary skill in the art would readily appreciate, STF fluid that is intercalated into a fabric or other material means, e.g., that the STF fluid is inserted between the fibers of a fabric or the reinforcement phase of a composite material (see FIG. 1). The STF intercalation confers to the fabric or other material properties that make the STF-intercalated fabric/material more suitable for environments that pose a risk to equipment or human and/or animal life. The STF-intercalated fabric layers disclosed herein exhibit enhanced thermal stability and/or tolerance or resistance to puncture, abrasion, cutting, ballistics, thermal stability and/or micrometeoroid and orbital debris penetration when compared to equivalent fabrics without STF treatment. Moreover, the STF-intercalated fabric layers provided herein exhibit low outgassing properties and an unexpected increase in dust-penetration resistance. The former prevents contamination of equipment and deleterious effects on human/animal health (e.g., due to the release of toxic and/or corrosive gas from the carrier fluid and/or fibers of the STF-intercalated fabric) while the latter reduces the risk that dust can damage equipment, damage human/animal cells, and/or otherwise cause health problems. Indeed, the STF intercalation confers to the fabric dust rejection and/or dust release properties that decrease the amount of dust and other similar particulates that become embedded in the fabric and/or pass through the fabric.

The STF-intercalated fabrics of the instant disclosure comprise a fabric component, such as a fabric containing high tenacity fibers, and an STF fluid. The STF fluids, STF-intercalated fabrics, and articles incorporated STF-intercalated fabrics of the instant invention will now be described in more detail below.

STF Fluids

As noted above, a textile can be combined with an STF fluid to increase the strength of the textile and render that textile, among other things, more resistant to damage and penetration. As will become apparent from this disclosure, the STF-intercalation described herein does not add significant weight to the textile, nor does it cause a large decrease in the textile's flexibility. Thus, the STF fluids impart these benefits while maintaining the textiles usefulness in safety apparel, such as an EPG.

The STF fluids provided herein may be concentrated dispersions of particulates within a carrier fluid that exhibit an increase in viscosity with increasing applied stress. When intercalated into fibers or a fabric, the STF remains flowable so as to not impede fabric flexibility, but modifies the coefficient of friction between the fibers by rigidizing during an impact event. When a shear stress is applied to the fabric, hydroclusters of the particulates form and become rigid rendering that portion of the fabric more resistant to penetration as compared to the same fabric without STF. Thus, in addition to filling the gaps in the fibers formed from a particular fabric weave, the STF fluid influences the properties of the fibers and/or yarns themselves. While not intending to be bound by theory, the transition to a shear thickening state of the hydroclusters is stress dependent, and the impact with a hypervelocity projectile would require a quick transition rate to effectuate a resistance to penetration. At low strain rates, for example associated with the wearer of an article of clothing comprising STF-intercalated fabrics, the fluid will offer little impediment to the article flexure and deformation. However, at the high strain rates associated with, e.g., a high velocity projectile, the fluid will increase in viscosity and in doing so, enhance the penetration resistance of the fabric. These unique properties of STF fluids result, in part, from the composition of the STF fluid, which comprises a plurality of particles and one or more carrier solvents or fluids.

In an STF fluid suitable for use herein, the particles are suspended in one or more carrier fluids. The STF particles may be stabilized in the carrier fluid or dispersed by charge, Brownian motion, adsorbed surfactants, and adsorbed or grafted polymers, polyelectrolytes, polyampholytes, or oligomers. It is preferable that the particles be rigid colloidal particles. Particles suitable for use in the STF-incorporated fabrics provided herein may be of any solid material, including spherical amorphous silica such as that produced via Stöber type synthesis, synthetic inorganic particles synthesized via solution precipitation processes such as precipitated calcium carbonate, or synthesized by gel-sol techniques (hematite, $TiO_2$), or fumed silica, or carbon black. In some embodiments, natural inorganic particulates such as montmorillonite and kaolin clays may be dispersed in carrier fluid to exhibit shear thickening behavior. In other embodiments, ground mineral powders, such as quartz, calcite, talcs, gypsum, and/or mica may be dispersed in carrier fluid to exhibit shear thickening behavior. The solid dispersed phase may also be polymeric in nature, such as plastisols generated through emulsion polymerization processes such as poly(tetrafluoroethylene), poly(methyl methacrylate) (PMMA), polystyrene (PS) microspheres. The solid phase may also be starch or other natural polymers. In some embodiments, particles suitable for use in the present disclosure may be oxides (e.g., silicon dioxide ($SiO_2$)); carbonates, (e.g., calcium carbonate, aluminum oxides, titanium dioxide ($TiO_2$), silicon carbon); titanates; synthetically occurring minerals; naturally occurring minerals; polymers (e.g., polystyrene or polymethyl methacrylate); carbon particles, including carbon black, carbon nanotubes, graphene, diamond, and graphite; metallic particles, including gold and silver nanoparticles; kaolin; montmorillonite; natural or synthetic clays, such as laponite; zeolites; and/or any combination of these particles. For instance, silica ($SiO_2$) particles may be used in the STF compositions provided herein. In other embodiments, polystyrene or polymethyl methacrylate particles are used in the STF compositions. In other embodiments, the STF composition comprises graphene or clay. In yet other embodiments, the STF composition comprises a mixture of particles, such as a mixture of silica and a clay or zeolite.

Suitable particle shapes include spherical particles, elliptical or elongated particles, or disk-like or clay particles. The particles may be synthetic and/or naturally occurring minerals. Also, the particles can be either monodisperse, bidisperse, or polydisperse in size and shape. In some embodiments, the particles suspended in the STF fluid are spherical (e.g., having an aspect ratio of about 1:1). In other embodiments, the particles suspended in the STF fluid are elongated having a width to height aspect ratio from between about 1.5:1 to about 20:1; preferably, the aspect ratio is from about 2:1 to about 15:1; more preferably, it is from about 3:1 to about 10:1. Furthermore, the diameter of the particles should be much smaller than the diameter of the fibers of the fabric. Particle size can be measured using a variety of art-standard particle size analyzer techniques, such as light scattering, gravitational settling of the particle, Brownian motion analysis, high definition image processing, and the like. Thus, in particular embodiments, the particles suspended in the STF fluid have an average particle size of less than about 4,000 nanometers (nm), e.g., 4,000 nm, 3,900 nm, 3,800 nm, 3,700 nm, 3,600 nm, 3,500 nm, 3,400 nm, 3,300 nm, 3,200 nm, 3,100 nm, 3,000 nm, 2,900 nm, 2,800 nm, 2,700 nm, 2,600 nm, 2,500 nm, 2,400 nm, 2,300 nm, 2,200 nm, 2,100 nm, 2,000 nm, 1,900 nm, 1,800 nm, 1,700 nm, 1,600 nm, 1,500 nm, 1,400 nm, 1,300 nm, 1,200 nm, 1,100 nm, 1,000 nm, 900 nm, 890 nm, 880 nm, 870 nm, 860 nm, 850 nm, 840 nm, 830 nm, 820 nm, 810 nm, 800 nm, 790 nm, 780 nm, 770 nm, 760 nm, 750 nm, 740 nm, 730 nm, 720 nm, 710 nm, 700 nm, 690 nm, 680 nm, 670 nm, 660 nm, 650 nm, 640 nm, 630 nm, 620 nm, 610 nm, 600 nm, 590 nm, 580 nm, 570 nm, 560 nm, 550 nm, 540 nm, 530 nm, 520 nm, 510 nm, 500 nm, 490 nm, 480 nm, 470 nm, 460 nm, 450 nm, 440 nm, 430 nm, 420 nm, 410 nm, 400 nm, 390 nm, 380 nm, 370 nm, 360 nm, 350 nm, 340 nm, 330 nm, 320 nm, 310 nm, 300 nm, 290 nm, 280 nm, 270 nm, 260 nm, 250 nm, 240 nm, 230 nm, 220 nm, 210 nm, 200 nm, 190 nm, 180 nm, 170 nm, 160 nm, 150 nm, 140 nm, 130 nm, 120 nm, 110 nm, 100 nm or less. In another embodiment, the particles suspended in the STF fluid have an average particle size of less than about 2,000 nm. In a preferred embodiment, the average particle size is between about 100 nm and about 1000 nm. In a more preferred embodiment, the particles have an average particle size of about 300 nm to about 700 nm. For instance, in one particular embodiment, monodisperse, spherical silica particles having an average particle size of about 500 nm are suspended in the carrier fluid. In some embodiments, the particles may be nanoparticles fused together, such as in fumed silica and carbon black, such that the aggregate particles are used to make a shear thinking fluid.

The shear thickening properties of the STF fluids described herein are influenced by the concentration of particles suspended in the carrier fluid. Thus, it is preferred that at least about 30% by volume of particles are suspended in the carrier fluid. For aggregates, these may be effective volume fractions of the aggregates, such that the actual particle volume fraction may only be a few percent. For instance, suitable STF fluid concentrations of particles by volume include 30%, 31%, 32%, 33%, 34%, 35%, 36%, 37%, 38%, 39%, 40%, 41%, 42%, 43%, 44%, 45%, 46%, 47%, 48%, 49%, 50%, or higher. It is preferred that the STF particle concentration be greater than 50% by volume to ensure strong shear thickening of the STF fluid. For instance, preferred STF fluid concentrations of particles by volume include 50%, 51%, 52%, 53%, 54%, 55%, 56%, 57%, 58%, 59%, 60%, 61%, 62%, 63%, 64%, 65%, 66%, 67%, 68%, 69%, 70%, 71%, 72%, 73%, 74%, 75%, or higher. Other suitable STF formulations comprise about 40% to about 85% by weight of particles; preferably, the particles are present in the STF fluid at about 50% to about 75% by weight; more preferably, between about 60% to 70% by weight. For instance, in one particular embodiment, the STF formulation comprises 60-70% by weight monodisperse, spherical silica particles having an average size of about 400 nm to about 600 nm. In some embodiments, a surfactant or dispersant is also added to the STF fluid. These dispersants act to prevent particle aggregation due to van der waals attraction and modulate the interparticle interactions that determine the critical shear rate and strength of shear thickening. Such surfactants and dispersants may include a number of amphiphilic molecules, including short chain alcohols (octadecanol or similar), fatty acids, natural emulsifiers (lecithin), ionic surfactants (SDS), non-ionic surfactants (polyoxyalklyene alkyl ether), polymers/co-polymers/block-copolymers and salts of polymers/co-polymers/block copolymers (such as BASF Pluronic products), succinimide detergents, low molecular weight acidic polyesters, polyisobutylene amide alkeneamine polyol and similar dispersants, salts of unsaturated polyamine amides.

As noted above, the STF fluid will also contain one or more carrier solvents or fluids, which confer flowability to the STF fluid to produce a fluid with a shear thickening property. Suitable solvents for use in an STF fluid can be aqueous in nature (i.e., water with or without added salts, such as sodium chloride, and buffers to control pH) for electrostatically stabilized or polymer stabilized particles, organic (e.g., ethylene glycol, polyethylene glycol, ethanol), or silicon based (e.g., silicon oils, phenyltrimethicone). The carrier fluid may also be composed of compatible mixtures of solvents, and may contain free surfactants, polymers, and oligomers. The carrier fluid should be environmentally stable so that it remains integral to the fabric and suspended particles.

In particular embodiments, however, STF fluids and STF-intercalated fabrics with low outgassing properties are desired. Outgassing occurs when the carrier fluid evaporates especially when, for instance, it is exposed to a vacuum or low air pressure environment. Outgassing, in turn, can result in re-condensation and collection of solvent fluid in equipment or human lungs causing equipment damage and health problems, respectively. Potential cross-contamination of solvent material may be especially dangerous in harsh environments, such as at great depths below sea-level (e.g., in response to a rapid change in pressure), low-earth orbits, outer space, or extraterrestrial surfaces where equipment failure may result in loss of life and/or where repair/replacement of damaged equipment is impractical or impossible. To this end, suspending the particles in low volatility carrier fluids reduces the incident of outgassing of the final product. Preferably, less than about 10% mass of the carrier fluid will be lost under a vacuum as measured using art-standard testing protocols well within the purview of the skilled artisan, such as the ASTM standard 595 or the NASA Standard 6001-B methods. More preferably, less than about 5%, e.g., about 5%, 4%, 3%, 2%, 1% or less of the mass of the carrier fluid is lost under a vacuum. Further, in it is desired that less than about 2% of the mass of carrier fluid that is evaporated under a vacuum be recondensed and collected in a standard outgassing test, such the standard protocols discussed herein. Preferably, less than about 1%, e.g., about 1%, 0.9%, 0.8%, 0.7%, 0.6%, 0.5%, 0.4%, 0.3%, 0.2%, 0.1%, or 0.05% of the evaporated mass of the carrier fluid is recondensed. For instance, in a particular embodiment, a suitable carrier fluid will exhibit less than about 2% mass lost under the standard vacuum test and less than 0.1% mass recondensed and collected.

Carrier fluids meeting the desirable outgassing properties will have a low vapor pressure. For instance, in some embodiments, the vapor pressure of the carrier fluid is less than about 1 millipascal (mPa) at 25° C., e.g., about 1 mPa, 0.1 mPa, 0.01 mPa, 0.001 mPa, 0.0001 mPa, 0.00001 mPa, 0.000001 mPa, 0.00000001 mPa, 0.000000001 mPa, 0.0000000001 mPa or less at 25° C. In other embodiments, the vapor pressure of the of the carrier fluid is less than about $1 \times 10^{-6}$ mPa at 25° C. In yet other embodiments, the vapor pressure of the carrier fluid is less than about $1 \times 10^{-7}$ mPa at 25° C. In still other embodiments, the vapor pressure of the carrier fluid is less than about $1 \times 10^{-8}$ mPa at 25° C. Carrier fluids with these low vapor pressure characteristics will exhibit greater thermal stability and less outgassing as compared to fluids with high vapor pressure. Suitable carrier fluids include low vapor pressure hydrocarbon fluids, fluorinated polyethers, or combination thereof. Preferably, carrier fluids may be selected from perfluropolyethers (PFPEs) or multiply-alkylated cyclopentanes (MACs). Suitable PFPEs may have a linear or pendant structure. Exemplary PFPEs include K-Type pendent PFPEs, Y-Type pendent PFPEs, D-Type linear PFPEs, M-Type linear PFPEs, and Z-Type linear PFPEs. For example, Z-Type PFPEs are linear PFPEs with the structure $CF_3—[OCF_2CF_2]m-(OCF_2)n]OCF_3$, such as the commercially available UNIFLOR 8981 (Nye Synthetic Lubricants, Fairhaven, MA, USA) with a vapor pressure of about $9.33 \times 10^{-6}$ mPa at 25° C. In some embodiments, a carrier fluid suitable for use in the STF fluid is a MAC. As with PFPEs, MAC fluids have high thermal stability and low vapor pressure. Commercially available MACs include the PENNZANE-based RHEOLUBE 2001A (Nye Synthetic Lubricants, Fairhaven, MA, USA) that has a vapor pressure of about $1.33 \times 10^{-6}$ mPa at 25° C.

The particles may be suspended in the carrier fluid by mechanical mixing, mechanical stirring, or sonication at a concentration of particles from about 40% to about 85% by weight. In some embodiments, the particles are suspended in the carrier fluid at a concentration from about 45% to about 80% by weight of particles. In others, the particle concentration is from about 50% to about 75% by weight. In yet other embodiments, the particles are suspended in the carrier fluid at a concentration from about 60% to about 70% by weight of particles. For instance, in a particular embodiment, about 60 wt % to about 70 wt % monodisperse, spherical silica particles having an average particle size of about 400 nm to about 600 nm are suspended in Z-Type PFPE fluid. In another embodiment, the silica particles are suspended in MAC fluid. In yet other embodiments, the silica particles are suspended in a mixture of PFPE and MAC fluid having a PFPE to MAC ratio of about 0.1 to about 10, e.g., 0.1, 0.5, 1.0, 1.5, 2.0, 2.5, 3.0, 3.5, 4.0, 4.5, 5.0, 5.5, 6.0, 6.5, 7.0, 7.5, 8.0, 8.5, 9.0, 9.5, or 10.0. In still other examples, the particles suspended in the PFPE and/or MAC fluid are graphene or clay particles having a spherical or elongated shape and an average particle size range from about 300 nm to about 700 nm. In others, precipitated calcium carbonate particles having an average particle size of less than about 1000 nm are suspended in the PFPE and/or MAC fluid.

The STF fluids described above may be used to enhance the MMOD penetration resistance, dust release and rejection, abrasion resistance, and/or cut and puncture resistance of any material without significantly reducing the flexibility of the material or significantly increasing the weight of that material. In preferred embodiments, the STF fluids are intercalated into high tenacity fabrics, which are fabrics comprised of high tenacity fibers.

STF-Intercalated Fabrics

In particular embodiments, fabrics are provided wherein the STF fluid described herein is intercalated into the fabric. In some embodiments, the fabrics are high tenacity fabrics. The STF-intercalated fabric is then enabled to undergo a shear-thickening transition such that the coefficient of friction between the fibers is increased during an impact event. The shear-thickening characteristic imparted to the fabric confers to the fabric increased strength and resistance to puncture, cutting, abrasion, and MMOD penetration. Further, the intercalation of the STF-fluid in the fibers provides the added benefit of preventing dust penetration. As noted above, preferred embodiments of the STF-fluids will also exhibit low outgassing. What is more, the STF-fluids of the present disclosure do not add significant weight to the fabric nor do they significantly alter the flexibility of the fabric. As such, provided herein are STF-intercalated fabrics ideally suited for, e.g., safety apparel for use in harsh environments where added protection is desired without sacrificing mobility.

As noted above, it is preferred that the STF-intercalated fabrics be made of high tenacity fibers. As one having ordinary skill in the art would readily appreciate, high tenacity fabrics are fabrics composed of fibers with high specific strength (tenacity) and high tensile strength. In some embodiments, the fabrics suitable for use herein will comprise fibers with a tensile strength of at least about 100 megapascal (MPa), e.g., 100 MPa, 110 MPa, 120 MPa, 130 MPa, 140 MPa, 150 MPa, 160 MPa, 170 MPa, 180 MPa, 190 MPa, 200 MPa, 210 MPa, 220 MPa, 230 MPa, 240 MPa, 250 MPa, 260 MPa, 270 MPa, 280 MPa, 290 MPa, 300 MPa, 310 MPa, 320 MPa, 330 MPa, 340 MPa, 350 MPa, 360 MPa, 370 MPa, 380 MPa, 390 MPa, 400 MPa, 410 MPa, 420 MPa, 430 MPa, 440 MPa, 450 MPa, 460 MPa, 470 MPa, 480 MPa, 490 MPa, 500 MPa, 510 MPa, 520 MPa, 530 MPa, 540 MPa, 550 MPa, 560 MPa, 570 MPa, 580 MPa, 590 MPa, 600 MPa, 620 MPa, 640 MPa, 650 MPa, 660 MPa, 670 MPa, 680 MPa, 690 MPa, 700 MPa, 710 MPa, 720 MPa, 730 MPa, 740 MPa, 750 MPa, 760 MPa, 770 MPa, 780 MPa, 790 MPa, 800 MPa, 810 MPa, 820 MPa, 830 MPa, 840 MPa, 850 MPa, 860 MPa, 870 MPa, 880 MPa, 890 MPa, 900 MPa, 910 MPa, 920 MPa, 930 MPa, 940 MPa, 950 MPa, 960 MPa, 870 MPa, 980 MPa, 990 MPa, or 1,000 MPa, or more. More preferably, the fibers will comprise high tenacity fibers having a tensile strength of at least about 250 MPa. In other embodiments, fabrics suitable for use herein will comprise fibers with a tensile strength of at least about 1 gigapascal (GPa) and, in some cases, even greater than about 2 GPa, e.g., 2.0 GPa, 2.1 GPa, 2.2 GPa, 2.3 GPa, 2.4 GPa, 2.5 GPa, 2.6 GPa, 2.7 GPa, 2.8 GPa, 2.9 GPa, 3.0 GPa, 3.1 GPa, 3.2 GPa, 3.3 GPa, 3.4 GPa, 3.5 GPa, 3.6 GPa, 3.7 GPa, 3.8 GPa, 3.9 GPa, 4.0 GPa, 4.1 GPa, 4.2 GPa, 4.3 GPa, 4.4 GPa, 4.5 GPa, 4.6 GPa, 4.7 GPa, 4.8 GPa, 4.9 GPa, or 5.0 GPa, or more. Additionally, high tenacity fabrics may comprise fibers having a specific strength of at least about 1,000 kilonewtons meters per kilogram (kN*m/kg). Preferably, the specific strength of the fibers will be at least about 1,500 kN*m/Kg, e.g., 1,500, 1,600, 1,700, 1,800, 1,900, 2,000, 2,100, 2,200, 2,300, 2,400, 2,500, 2,600, 2,700, 2,800, 2,900, 3,000, 3,100, 3,200, 3,300, 3,400, 3,500, 3,600, 3,700, 3,800, 3,900, 4,000 kN*m/kg. In some embodiments, the specific strength of the fibers will be at least about 2,500 kN*m/kg.

Exemplary fabrics meeting the above criteria are made from fibers that include, but are not limited to, aramid fibers (e.g., para-aramid and meta-aramid), ultra-high molecular weight polyethylene fibers (e.g., SPECTRA or DYNEEMA), polytetrafluoroethylene fibers (PTFE) or expanded/stretched PTFE (e.g., GORE-TEX), polyethylene terephthalate fibers (e.g., DACRON), fibers made from copolymers of paraphenylenediamine and diaminodiphenyl ether (e.g., TECHNORA), aromatic polyester fibers produced by polycondensation of 4-hydroxybenzoic acid and 6-hydroxynapthalene-2-carboxylic acid (e.g., VECTRAN), or any combination thereof. Exemplary aramid fibers suitable for use herein include, but are not limited to, poly-(p-phenylene terephthalamide) (e.g., KEVLAR, TWARON, or HERACRON) and poly-(m-phenylene isophthalamide) (e.g., NOMEX). Some combination fabrics may include orthofabrics comprising a three-beam weave with one surface of ePTFE interwoven into a second surface of poly-(m-phenylene isophthalamide) interlaced with a poly-(p-phenylene terephthalamide) lattice (e.g., a three-beam weave of GORE-TEX, NOMEX, and KEVLAR) or a composite textile comprising a two-beam weave with one surface of ePTFE interwoven into a second surface comprising aromatic polyester fibers produced by polycondensation of 4-hydroxybenzoic acid and 6-hydroxynapthalene-2-carboxylic acid (e.g., a two-beam weave of GORE-TEX and VECTRAN).

In some embodiments, the STF-intercalated fabrics comprise one or more of UHMWPE, PTFE, ePTFE, polyethylene terephthalate fibers, fibers made from copolymers of paraphenylenediamine and diaminodiphenyl ether, aromatic polyester fibers produced by polycondensation of 4-hydroxybenzoic acid and 6-hydroxynapthalene-2-carboxylic acid, poly-(p-phenylene terephthalamide), poly-(m-phenylene isophthalamide), or any combination thereof. In another embodiment, the fabric is made from UHMWPE fibers. In other embodiments, it is an orthofabric. In yet other embodiments, the high tenacity fabric is made from VECTRAN or GORE-TEX fibers. In still others, the STF is intercalated into KEVLAR or NOMEX. The high tenacity fabrics disclosed herein may be constructed using any art-standard textile technique for making fabrics and are typically commercially available. In general, these fabrics may be woven from yarns having a denier from about 25 to about 3,000. In some embodiments, the fabrics are woven from yarns that have a denier from about 100 to about 800. Furthermore, the yarns may be comprised of multiple filaments in the range of 0.1 to 100 denier per filament (dpf); preferably, in the range of 1 to 10 dpf. For instance, VECTRAN is 5 dpf, SPECTRA is 1.5 to 10.8 dpf, and NOMEX and KEVLAR are 1 to 10 dpf. An exemplary hybrid fabric of GORE-TEX and VECTRAN may each have a denier of 400.

In some embodiments, a fabric suitable for use herein is chosen based on its ability to absorb radiation. While not intending to be bound by theory, fibers having high hydrogen content (e.g., at least a 2 to 1 ratio of hydrogen to carbon) are believed to exhibit desirous radiation absorption characteristics. An exemplary high tenacity fabric with desired radiation absorption is a fabric comprising UHMWPE fibers.

The STF fluid may be intercalated into the fabric by a dip coating and padding technique. The STF fluid is first diluted in volatile diluent fluid, such as an alcohol (e.g., ethanol, methanol, isopropyl alcohol, etc.), at a volumetric ratio that ranges from about 1:1 diluent to STF fluid to about 10:1 diluent to STF fluid, e.g., 0.5:1, 1:1, 1.5:1, 2:1, 2.5:1, 3:1, 3.5:1, 4:1, 4.5:1, 5:1, 5.5:1, 6:1, 6.5:1, 7:1, 7.5:1, 8:1, 8.5:1, 9:1, 9.5:1, or 10:1 volumetric ratio of diluent to STF fluid; preferably between about 1:1 to about 4:1 diluent to STF fluid. The fabric is then dipped into the diluted STF fluid for a period of time. In some embodiments, the period of time is at least about 10 seconds. In other embodiments, the period of time is at least about 30 seconds, e.g., 30, 35, 40, 45, 50, 55, 60, 65, 70, 75, 80, 85, 90, 95, or 100, or more seconds. In other embodiments, the period of time is at least 1 minute. In some embodiments, the diluted STF fluid is contained in an agitated bath such that when the fabric is dipped in the agitated bath, the agitation aids with the intercalation of the diluted STF fluid into the fabric. It is desired that the STF fluid be distributed uniformly throughout the fabric. Further, as increasing amounts of STF fluid has diminishing returns, excess STF fluid should be removed to avoid adding weight to the fabric. To this end, once the fabric is dipped in the diluted STF fluid, it can be squeezed through a set of rollers to remove excess fluid and control uptake of the STF fluid in the fabric. As one skilled in the art would appreciate, this technique is known in the textile industry as a padding process. The STF-intercalated fabric is then dried using any convention means (e.g., an oven) to remove the volatile diluent fluid. The time and temperature of the drying step may vary depending on the specifics of the materials used, such as the vapor pressure of the volatile fluid and the time and temperature required to optimize the removal of the diluent without damaging the fabric or carrier fluid. In some embodiments, the drying step is carried out between about 50° C. and 100° C.; preferably, the temperature is between about 60° C. and 80° C. The drying time can be from about 10 minutes to about 2 hours or more, e.g., 10 min, 20 min, 30 min, 40 min, 50 min, 60 min, 70 min, 80 min, 90 min, 100 min, 110 min, 120 min or more.

Thus, the STF-fluids can be intercalated into high tenacity fabrics to confer to the fabrics increased strength and increased resistance to dust, puncture, abrasion, cutting, and MMOD penetration as compared to untreated, or neat fabric without adding significant weight to the fabric. Therefore, the STF-intercalated fabrics provided herein are also flexible and light weight making them suitable for a variety of uses. In some embodiments, the STF fluid causes a weight increase of the STF-intercalated fabric as compared to the equivalent neat fabric, where the weight increase is less than about 40%. In other embodiments, the weight increase is less than about 35%, e.g., 35%, 34%, 33%, 32%, 31%, 30%, 29%, 28%, 27%, 26%, 25%, 24%, 23%, 22%, 21%, 20%, 19%, 18%, 17%, 16%, 15%, 14%, 13%, 12%, 11%, 10%, 9%, 8%, 7%, 6%, 5%, 4%, 3%, 2%, or 1%. In some embodiments, the weight increase is less than about 30%. In others, it is less than about 20%. In yet others, the weight increase is equal to or less than about 15%.

In addition, the STF fluid intercalation does not cause a large decrease in flexibility of the STF-intercalated fabric as compared to the equivalent, neat fabric. A suitable measure of the flexibility of the fabric is flexural rigidity. In some embodiments, STF intercalation decreases the flexural rigidity of a fabric by at least about 1%, e.g., 2%, 3%, 4%, 5%, 6%, 7%, 8%, 9%, 10%, 11%, 12%, 13%, 14%, 15%, 16%, 17%, 18%, 19%, 20%, 21%, 22%, 23%, 24%, 25%, 26%, 27%, 28%, 29%, 30% or more; preferably, it is decreased by more than about 5%, as compared to the untreated fabric. In some embodiments, the flexural rigidity is decreased by at least about 10%. For some fabrics, the STF treatment slightly increases the flexural rigidity (i.e., decreases the flexibility). However, in these embodiments, STF treatment increases the flexural rigidity of the fabric by less than about 30%, e.g., 30%, 29%, 28%, 27%, 26%, 25%, 24%, 23%, 22%, 21%, 20%, 19%, 18%, 17%, 16%, 15%, 14%, 13%, 12%, 11%, 10%, 9%, 8%, 7%, 6%, 5%, 4%, 3%, 2%, 1%, or less after STF intercalation; preferably, less than about 25%.

The STF-intercalated fabrics described above can be used as stand-alone fabrics or included in a single- or multi-layer article (e.g., a safety suit designed for low-earth orbit or as part of an extra-vehicular mobility unit (EMU)). In some embodiments, the thermal stability characteristics of the STF-intercalate fabrics of the present disclosure allow for construction of articles used in, e.g., firefighting.

Uses of STF-Intercalated Fabrics.

The STF-intercalated fabrics provided herein are suitable for use as stand alone fabrics, such as fabrics used as a covering to protect equipment from flying dust and debris. In other embodiments, the STF-intercalated fabrics are used as part of a multi-layer article. In some aspects, the multi-layer article is a safety suit, such as an extra-vehicular mobility unit (EMU) or environmental protection garment (EPG). In such embodiments, the STF-intercalated fabrics may be used as an internal and/or outer layer of the safety suit.

Figure 2A:
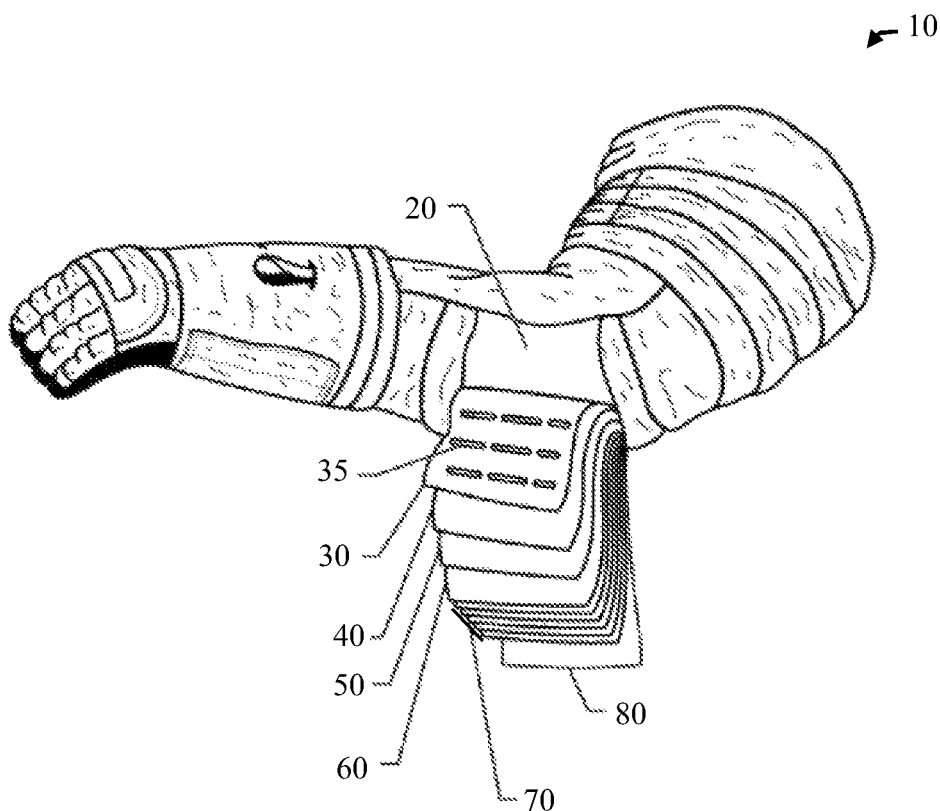
FIG. 2A is a diagram of a conventional multi-layer fabric motility portion of an EPG that includes an LCVG and a TMG.

In a particular embodiment, the STF-intercalated fabrics are used to construct EMU or EPG safety suits with increased resistance to puncture, abrasion, cut, MMOD impact, and/or dust penetration. Conventional EMU suits currently available for Extra-Vehicular Activity (EVA) are comprised of a hard upper torso and soft fabric mobility joints. Shown in FIG. 2A is a diagram of a portion of the soft fabric mobility joints currently in use. The fabric mobility portion 10 of the EMU suit consists of a Liquid Cooling and Ventilation Garment (LCVG) and a multi-layer garment that is worn over the LCVG referred to as a Thermal Micrometeoroid Garment or TMG. As depicted in FIG. 2A, the LCVG comprises an inner liner 20 and an LCVG layer 30. Typically, the inner liner 20 is made from nylon tricot fabric and goes against the wearer's body. The LCVG layer 30 is made from a combination of nylon and spandex and is laced with thin plastic tubes 35 designed to flow cool water across the body of the wearer to ensure uniform heat distribution in response to the extreme temperatures of space. A multi-layer TMG is worn over the LCVG and consists of a bladder layer 40, a restraint layer 50, a liner 60, several insulation layers 70, and an outer cover or layer 80. The LCVG layer 30 is held against the body by a urethane-coated nylon bladder layer 40 that serves to prevent the leakage of air pressure, which is vital to the survival of the wearer when exposed to the unforgiving environment of space. The restraint layer 50 is disposed on the bladder layer 40 to protect and retrain the bladder layer 40. The restraint layer 50 is usually made of high tenacity fabric, such as DACRON. A neoprene coated nylon ripstop 60 separates the restraint and bladder layers from the insulating layers 70. The insulating layers 70 serve to prevent heat loss from the interior of the suit. The insulating layers 70 comprise five to seven sheets of aluminized biaxially-oriented polyethylene terephthalate (MYLAR). Over the insulating layers is an outer TMG cover 80, typically composed of orthofabric, and functions to prevent the puncturing and tearing of the suit.

However, the current EMU shown in FIG. 2A is not suitable for prolonged use in low-earth orbit environments or for EVA on, e.g., the Martian landscape. For example, conventional suits are prone to dust contamination, which would only be exacerbated in the Martian atmosphere. The STF-intercalated fabrics provided herein can be used to enhance the MMOD penetration resistance of the EMU while keeping the weight of the suit light enough for the wearer to be able to work for an extended period of time, even in the presence of gravity. Further, an enhanced resistance to tearing, cutting, and abrasion due to the rocky Martian terrain is especially desired. Moreover, the STF-intercalated fabrics can confer to the EMU a dust mitigation property not realized by existing EMU fabrics. Finally, the present STF-intercalated fabrics are made with materials having a very low vapor pressure thus reducing outgassing and, as a result, reducing the likelihood of harming the health of the wearer or cross-contaminating the life support system in the EMU or nearby equipment.

Thus, provided herein are multilayer articles comprising STF-intercalated fabrics that can be used as, e.g., safety suits and/or as a component of a EMU or EPG. In such multilayer articles, an STF-intercalated fabric can be incorporated into one or more of the article's layers. In some embodiments, at least one of the STF-intercalated fabric layers described herein is used in the multi-layer article (e.g., TMG). By replacing one or more of the existing layers in a conventional EMU or EPG, for example, one can confer to the modified suit the benefits discussed above without increasing the weight of the suit or decreasing the mobility/flexibility of the suit.

For instance, in one embodiment, the neoprene coated nylon ripstop liner can be replaced with an STF-intercalated fabric, such as an STF-intercalated fabric made from KEVLAR, DACRON, SPECTRA, VECTRAN, or a combination thereof, which provides an absorber layer to protect the interior of the suit against cuts, abrasions, punctures, and the like. In other embodiments, the STF-intercalated absorber layer comprises an orthofabric, such as a three-beam weave of GORE-TEX, KEVLAR, and NOMEX, or a composite textile of a two-beam weave of GORE-TEX and VEC- TRAN. In yet other embodiments, the STF-intercalated absorber layer comprises SPECTRA fabric. In others, it is made from VECTRAN fabric or KEVLAR fabric.

In addition, in some embodiments the restraint layer can also be replaced with an STF-intercalated fabric, such as an STF-intercalated fabric made from KEVLAR, DACRON, SPECTRA, VECTRAN, or a combination thereof, which provides a restraint layer that also serves as an absorber layer to protect the interior of the suit against cuts, abrasions, punctures, and the like. In other embodiments, the STF-intercalated restraint/absorber layer comprises an orthofabric or a composite textile. In yet other embodiments, the STF-intercalated restraint/absorber layer comprises SPECTRA fabric. In others, it is made from VECTRAN fabric or KEVLAR fabric. In some embodiments, the restraint layer and the ripstop layer of conventional TMGs are replace with one or more of the STF-intercalated fabrics described herein to create a bi-layer absorber. For instance, in one embodiment, the bi-layer absorber comprises a SPECTRA fabric and KEVLAR fabric. In others, the bi-layer absorber comprises a SPECTRA fabric and VECTRAN fabric. In still others, it comprises two SPECTRA, VECTRAN, or KEVLAR fabrics.

In still other embodiments, the outer TMG layer is replaced with an STF-intercalated orthofabric or an STF-intercalated fabric comprising VECTRAN, GORE-TEX, or a composite textile (e.g., of VECTRAN and GORE-TEX). Alternatively, the outer TMG layer of the EMU may comprise STF-intercalated VECTRAN, KEVLAR, DACRON, SPECTRA, GORE-TEX, or a combination thereof. The improved TMGs described herein may also have an STF-intercalated absorber layer, an STF-intercalated restraint/absorber layer, and an STF-intercalated outer TMG layer made from any of the materials discussed above. In other embodiments, the TMG contains the STF-intercalated absorber layer only. In yet others, it contains the STF-intercalated absorber layer and the STF-intercalated outer TMG layer. These modified TMGs can be further illustrated by the non-limiting exemplary embodiments described in FIGS. 2B-2D.

Figure 2B:
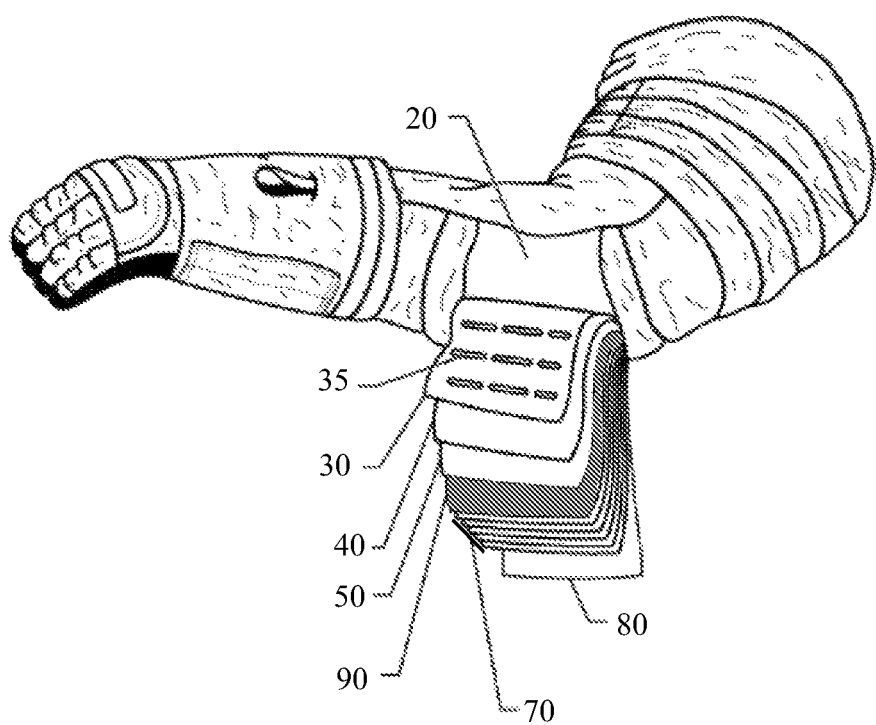
FIG. 2B is a diagram depicting an embodiment of a multi-layer article with an STF-intercalated fabric absorber layer. The darkened layer represents the STF-intercalated fabric.
Figure 2C:
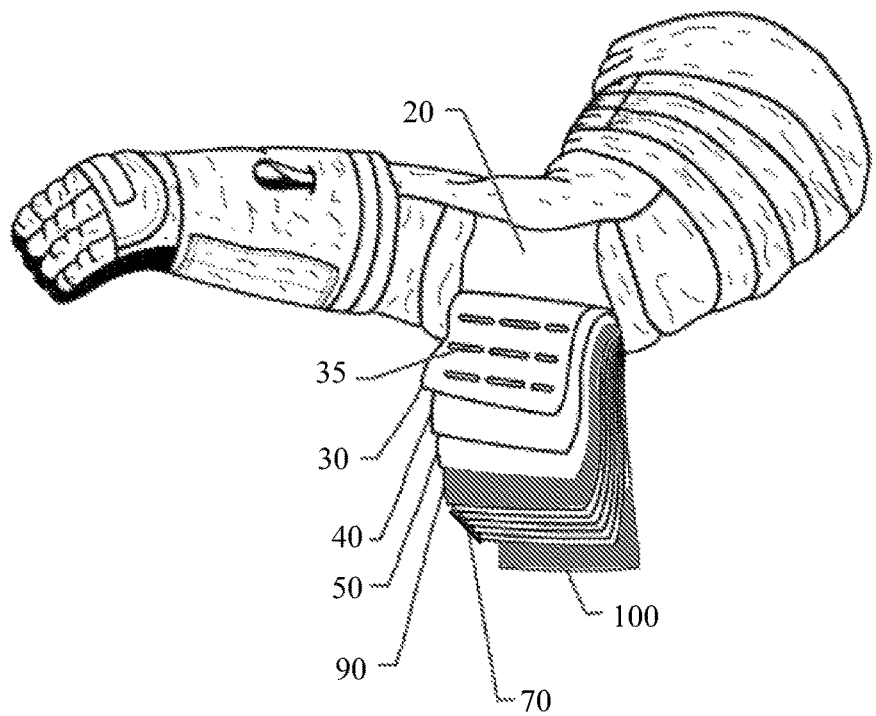
FIG. 2C is a diagram depicting an embodiment of a multi-layer article with an STF-intercalated fabric absorber layer and an STF-intercalated fabric outer layer. The darkened layers represent STF-intercalated fabrics.

As shown in FIG. 2B, an STF-intercalated absorber layer 90 is disposed between the restraint layer 50 and the insulating layers 70. In this embodiment, the restraint layer may be made from SPECTRA fabric and the STF-intercalated absorber layer 90 may be made from SPECTRA, KEVLAR, or VECTRAN fabric. The STF-intercalated absorber layer 90 prevents MMOD from penetrating through the restraint layer 50 and bladder layer 40. A non-limiting exemplary embodiment of a TMG with two STF-intercalated fabric layers is shown in FIG. 2C. As shown in FIG. 2C, an STF-intercalated absorber layer 90 is disposed between the restraint layer 50 and the insulating layers 70 and the outer TMG cover is replaced with an STF-intercalated outer layer 100. In this non-limiting exemplary embodiment, the STF-intercalated absorber layer 90 is made from SPECTRA fibers and the STF-intercalated outer layer 100 is made from orthofabric. However, it should be understood that both the STF-intercalated absorber layer 90 and the STF-intercalated outer layer 100 can be made from using any of the STF fluids and fabrics described herein. For instance, in another embodiment, the STF-intercalated outer layer 100 is an STF-intercalated VECTRAN fabric or a GORE-TEX fabric. The STF-intercalated outer layer 100 provides added protection against MMOD projectiles and has the added benefit of preventing dust penetration, which is particularly desirable when operating on a lunar or Martian landscape. As the STF-intercalated absorber layer also protects against dust penetration, the multi-layer EMU materials provided herein has at least two layers of protection against dust contamination.

Figure 2D:
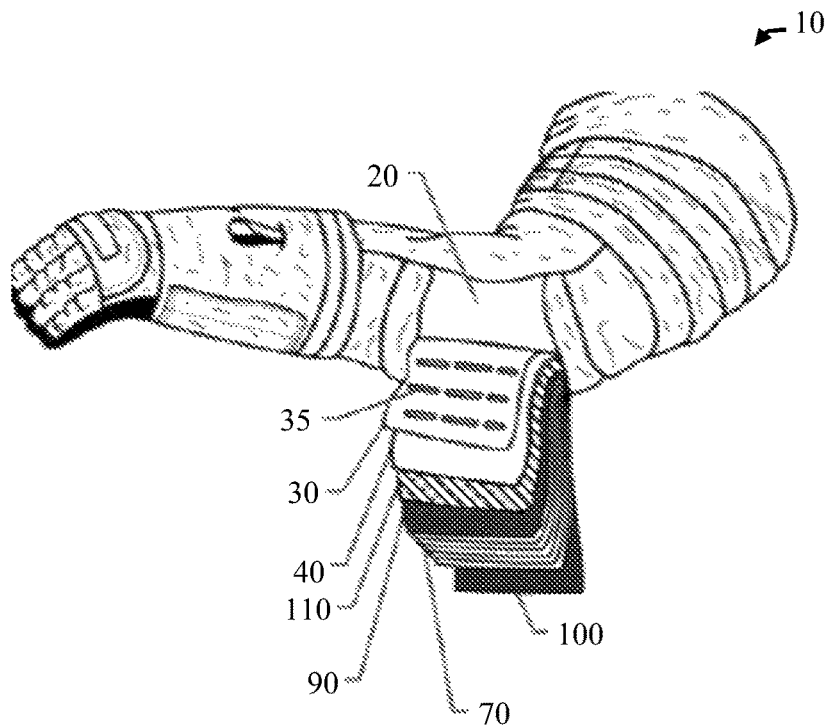
FIG. 2D is a diagram depicting an embodiment of a multi-layer article with an STF-intercalated restraint layer (striped layer), an STF-intercalated fabric absorber layer (darkened layer), and an STF-intercalated fabric outer layer (darkened layer).

In other embodiments, the TMG comprises three STF-intercalated fabric layers. FIG. 2D depicts a non-limiting embodiment of a TMG with an STF-intercalated fabric layer 110 disposed over the bladder layer 40 and under an STF-intercalated absorber layer 90. In FIG. 2D, the STF-intercalated fabric layer 110 serves as a restraint layer (i.e., supporting the bladder layer 40) and as a second absorber layer (i.e., protecting against dust and projectile penetration as well as cutting, puncture, and abrasion). In this embodiment, the TMG also comprises an STF-intercalated outer layer 100. The STF-intercalated fabric layer 110 may be made from SPECTRA, KEVLAR, VECTRAN, or one of the other suitable fabrics disclosed herein. In such embodiments, the restraint layer and liner have been replaced with an STF-intercalated bi-layer absorber. In such embodiments, the bi-layer absorber may comprise two fabric layers of the same type of STF-intercalated fabric (e.g., STF-intercalated SPECTRA) or different type of STF-intercalated fabric (e.g., STF-intercalated KEVLAR and STF-intercalated SPECTRA). The bi-layer absorber layer may comprise STF-intercalated KEVLAR, STF-intercalated SPECTRA, STF-intercalated VECTRAN, STF-intercalated orthofabric, or some combination of two of the foregoing.

While the STF-intercalated layers protect against dust penetration, it may also be desirable to add an additional coating, e.g., to the outermost layer, that prevents dust adhesion and promotes dust release. Coatings with hydrophobic properties and, in particular, superhydrophobic coatings can be used to coat the TMG outer layer to provide this dust release, or self-cleaning, benefit. To this end, the STF-intercalated outer layer may further comprise a superhydrophobic coating, such as the NANOMYTE coating commercially available from NEI corporation. The superhydrophobic coating can be applied to the STF-intercalated outer layer by art-standard techniques, such as spray-on, roll-on, or dipping. The superhydrophobic coating provides a "lotus-effect", which are self-cleaning properties exhibited by the leave of the lotus flower (Nelumbo). As such, the STF-intercalated outer layer provides enhanced dust penetration resistance by rejecting dust adhesion and increasing dust release from the surface.

Alternatively, the STF-intercalated outer layer may further comprise a silicone coating, such as the SILASTIC or SYLGARD coatings commercially available from Dow Chemical Company (Midland, MI, USA). The silicone coating may be applied by blade coating, roll-on, dipping, or other art-standard techniques. In some embodiments it may be preferable to remove volatile components from the silicone by baking the uncured silicone in an oven, applying vacuum, or simultaneously applying heat and vacuum. The silicone may be further modified by adding particles to the uncured silicone at a concentration of between 1 and 25 percent by weight, e.g., 1, 1.5, 2, 2.5, 3, 3.5, 4, 4.5, 5, 5.5, 6, 6.5, 7, 7.5, 8, 8.5, 9, 9.5, 10, 11, 12, 13, 15, 16, 17, 18, 19, 20, 21, 22, 23, 24, or 25 percent by weight. For instance, in a particular embodiment, the particles are added to the uncured silicone at a concentration of between about 2.5 to about 10 percent by weight. In other embodiments, they are added at a concentration of between about 5 and about 7.5 percent by weight. The particles may be oxides, calcium carbonate, synthetically occurring minerals, naturally occurring minerals, polymers, titanates, carbon particles, metallic particles, zeolites, or a mixture thereof. In some embodiments, the particles are PTFE particles. Moreover, the particles, e.g., may have an average particle size of between about 300 nm to about 10 µm, e.g., 300 nm, 350 nm, 400 nm, 450 nm, 500 nm, 550 nm, 600 nm, 650 nm, 700 nm, 750 nm, 800 nm, 850 nm, 900 nm, 950 nm, 1 µm, 1.5 µm, 2 µm, 2.5 µm, 3 µm, 3 µm. 5 µm, 4 µm, 4.5 µm, 5 µm, 5.5 µm, 6 µm, 6.5 µm, 7 µm, 7.5 µm, 8 µm, 8.5 µm, 9 µm, 9.5 µm, or 10 µm, and an aspect ratio of about 1:1 to about 10:1.

In addition to use in multi-layer TMGs, the STF-intercalated fabrics provided herein can be used in other safety apparel, such as flame-resistant fire-fighting turnout gear (e.g., coat, pants, flash hood, overalls, gloves). For instance, an STF-intercalated NOMEX fabric can be used in such apparel to provide the necessary particle and dust penetration resistance in addition to being flame resistant. The dust mitigation properties of the STF-intercalated fabrics can prevent, e.g., dust contaminated with toxic chemicals from penetrating the wearer's safety apparel. Other uses include equipment covers, hazmat suits, fire proximity suits, and other safety equipment.

The following examples describe the invention in greater detail. They are intended to illustrate, rather than to limit, the invention.

Example 1. Materials and Methods

STF Intercalation in High Tenacity Fabrics

Fabrics made from poly-(p-phenylene terephthalamide) fibers (KEVLAR 779; JPS Composite Materials, Anderson, SC, USA), UHMWPE fibers (SPECTRA 1000; Fabric Development, Inc., Quakertown, PA), and orthofabric (three weave blend of GORE-TEX, NOMEX, and KEVLAR) were treated with STF fluid. The fabric properties of the KEVLAR and SPECTRA fabrics are provided in Table 1.

TABLE 1

KEVLAR and SPECTRA Fabric Properties.

| Fabric | Denier | Weight (gsm) | Warp/fill count (TPI) | Thickness (mm) | Tensile strength warp/fill (lbf/in) |
|---|---|---|---|---|---|
| KEVLAR 779 | 200 | 125 | 70/70 | 0.18 | 350/350 |
| SPECTRA 1000 | 375 | 194 | 54/50 | 0.40 | 1015/1170 |

Gsm, grams per square meter; TPI, twists per inch; mm, millimeters; lbf/in, pounds force per inch.

Two different STF fluid formulations were intercalated into each of the KEVLAR fabric, SPECTRA fabric, and orthofabric—a silicone-based formulation and a MAC-based formulation. For the silicone-based formulation, 67 wt % amorphous silica particles (average particle size of about 100 nm) were suspended in a polyphenylmethylsiloxane silicone oil (Sigma-Aldrich). The STF fluid was diluted with 200 proof ethanol in a 2:1 ethanol to STF volumetric ratio. The fabrics were immersed in a bath containing the diluted STF fluid for 1 minute and then compressed with nip rollers, whereby the STF fluid was intercalated into the fabric (i.e., the STF fluid was located between fibers within yarns and is not a typical surface coating). The ethanol diluent was evaporated at 70° C. for 1 hour.

To formulate a low outgassing STF fluid, a MAC-based STF fluid (designated herein as STF hydrocarbon or STFhc) was made with PENNZANE 1001A synthetic oil (Nye Lubricants), which meets aerospace outgassing requirements. The MAC-based formulation contained 72% by weight amorphous silica particles (particle size of 500 to 600 nm) suspended in PENNZANE 1001A hydrocarbon oil (Nye Lubricants). For Example 4, STFhc fluids were also made from the hydrocarbon carrier fluids, poly-alpha olefins (SPECTRASYN). The poly-alpha olefins (PAO) were used to make STFhc-intercalated fabrics.

The STFhc fluid was diluted with 1-Pentanol in a 4:1 1-Pentanol to STF fluid volumetric ratio. A dispersant (based on an unsaturated polyamine amide) was also used, such that the amount of dispersant added was 3% of the total particle weight. The fabrics were immersed in a bath containing the diluted STFhc fluid for 1 minute and then compressed with nip rollers, whereby the STFhc fluid was intercalated into the fabric. The 1-Pentanol diluent was evaporated at 70° C. for 1 hour.

The STF-intercalated fabrics were tested in Examples 2-8.

Puncture Resistance Test

Figure 3:
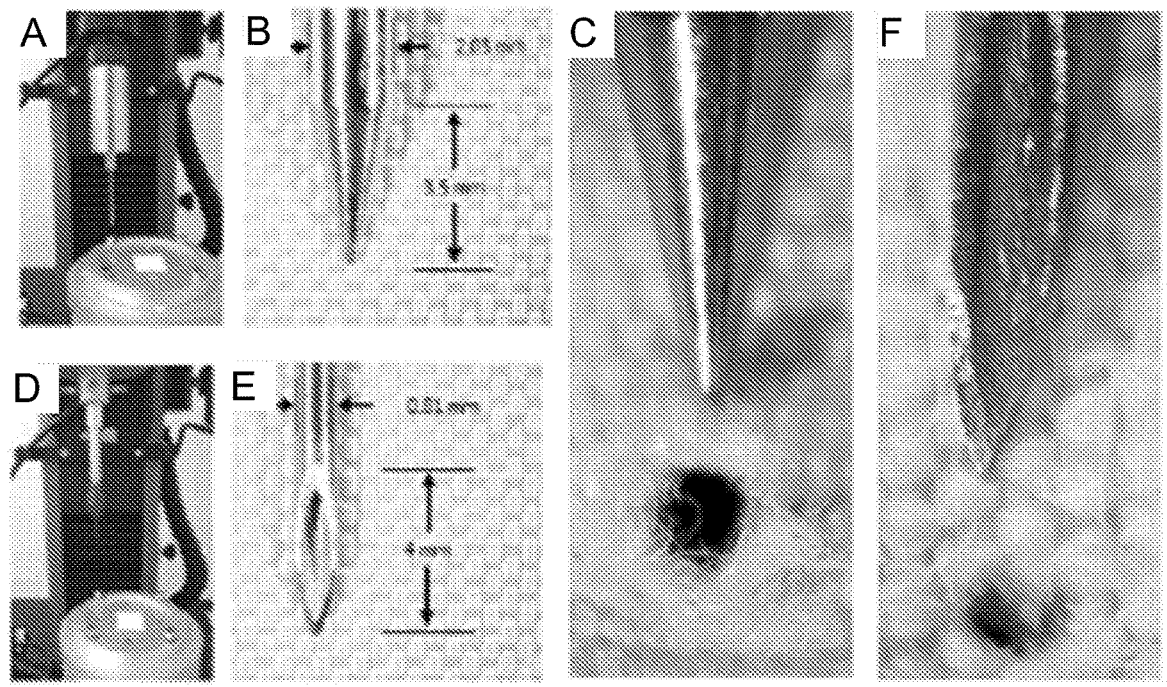
FIG. 3 provides images of the ASTM F-2878 probe and 21 gauge needle. Panel A is a picture of the Instron device and fabric mounting platform for the ASTM F-2878 round tip probe. Panels B and C are enlarged pictures of the ASTM F-2878 probe. Panel D is a picture of the Instron device and fabric mounting platform for the 21 gauge cut-puncture needle. Panels E and F are enlarged pictures of the 21 gauge needle.

The resistance to puncture by pointed objects and cut-puncture threats was measured using an Instron 5943 load frame. Single-layer fabric samples were tested using the standard ASTM F-1342 probe to measure the resistance to puncture by pointed objects. Cut-puncture resistance was measured using a 21 gauge needle as specified in ASTM F-2878. Each probe penetrated the fabric sample at a rate of 10 mm/min while a 1 kN load cell measured force. The maximum force for each puncture experiment was averaged and reported. Eight individual puncture experiments were performed on each sample. The ASTM F-2878 probe and 21 gauge needle is shown in FIG. 3.

Abrasion and Dust Resistance Test

Figure 4:
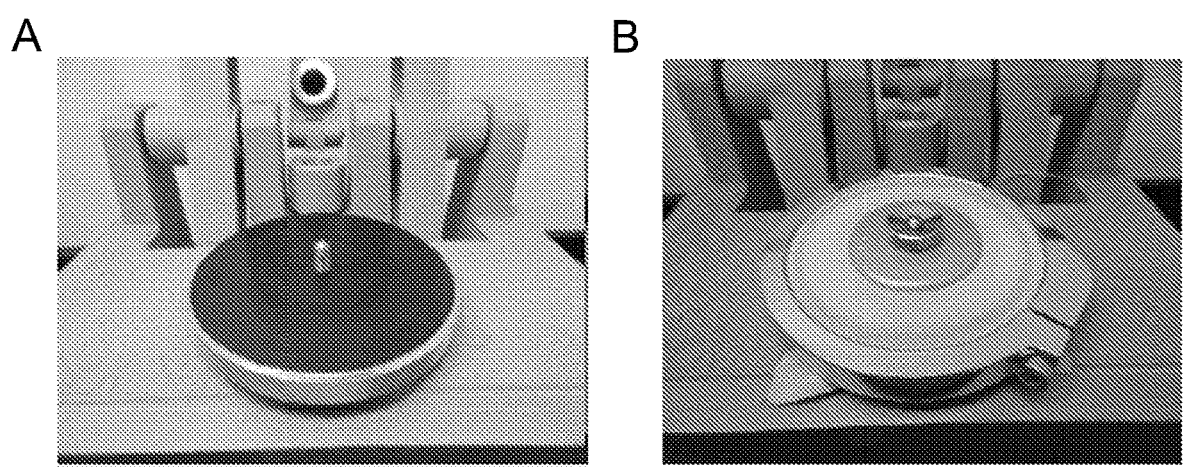
FIG. 4 displays pictures of the Taber Abraser test platform for conducting an abrasion test. Panel A is a Taber Abraser test platform with a rubber pad. Panel B is the Taber Abraser test platform with a fabric test specimen securely clamped.

The abrasion resistance and simulated Mars regolith penetration resistance of the fabric samples were measured using a Taber Abraser 5130. Square test specimens were clamped to the test platform as shown in FIG. 4. Abrasion resistance was measured using standard abraser test methods and an H-22 (ceramic oxide) wheel to represent heavy abrasive threats (see FIG. 5B). An alternate test method was developed to investigate simulant migration through the test specimen. Genuine Taber CS-0 rubber wheels were coated with strips of the test fabric and 0.3 grams of JSC Mars-1A simulant (Orbital Technologies Corporation) was applied evenly to the surface of the test specimen (see FIG. 5C). A witness paper located below the test specimen was used to monitor the amount of simulant that penetrated through the textile. An overview of both test methods is shown in FIG. 6.

The tests were typically run for a minimum of 10,000 cycles, however the number of cycles was adjusted based on the material being tested and regular observations of the sample. Tests were stopped when materials developed visible holes before 10,000 rotations. Fabrics that did not show gross damage were subjected to a higher number of cycles, until damage was observed. Simulant wear tests were also performed on orthofabric and Mylar for 250,000 cycles to simulate the effects of repeated flexion/rubbing in the presence of regolith.

Figure 7:
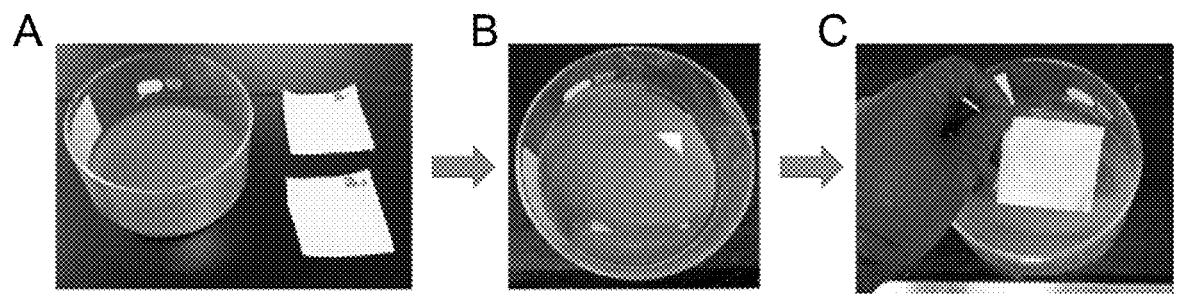
FIG. 7 is an illustration of the dust immersion test. Panel A shows the squares of textile samples next to a container of 50 grams of JSC Mars-1A regolith simulant. Panel B is a close-up top view of the container of simulant. In panel C, the textiles are immersed in the simulant and agitated for one minute.

An additional test was used to evaluate the dust adhesion and ease of removal after the textile is completely immersed in simulant. The dust immersion test is depicted in FIG. 7. Briefly, fabric samples were immersed in a dish containing an excess of JSC Mars-1A simulant and agitated for 30 seconds. Samples were photographed after immersion and were then subjected to a 30 second air jet to test simulant removal.

Flex Testing

Figure 8:
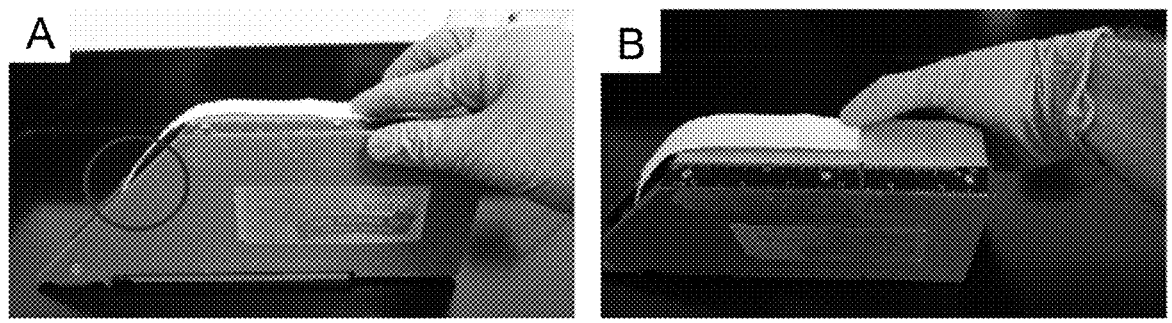
FIG. 8 is an illustration of the flexural rigidity testing apparatus. Panel A is a picture showing a 25.4 mm wide fabric strip pushed forward along the flat part of the device until the leading edge made contact with the slant. Panel B is a picture showing that the fabric overhang length is recorded for flexural rigidity calculations.

The stiffness of fabric samples with and without STF treatment were measured following the procedure defined by ASTM D1388. In this test, a cantilevered strip of fabric was pushed over an inclined ramp until the weight of the fabric caused the strip to bend and touch the ramp. The test is illustrated in FIG. 8. The length of fabric pushed over the edge was defined as the length of overhang, 0 (mm), and is divided by 2 to find the bending length, c (mm) according to Equation 1.

$$c = 0/2 \qquad \text{Equation 1}$$

Flexural rigidity, (μjoule/m), is the product of areal density, (g/m2), the bending length cubed, and a constant defined by the geometry of the standard apparatus.

Example 2. STF Intercalation and Uptake

The mass uptake for each of the silicone-based and MAC-based STF-intercalated fabrics described Example 1 were determined by measuring the final mass of the STF-intercalated fabric and comparing it with the mass of the neat (untreated) fabric. The STF uptake data for each of these fabrics is summarized in Table 2. The 4:1 dilution ratio for the MAC-based STFhc treatment process resulted in significantly lower weights for the treated fabrics compared to the silicone-based STF-intercalated fabrics.

Although individual fabric layers gained mass upon treatment, the layered feature of EVA suits provides the potential for achieving a desired or improved performance level with fewer layers of material, thereby decreasing the mass, thickness, or stiffness of the overall spacesuit. STF-intercalated fabrics made from thin, light fabrics, such as KEVLAR and SPECTRA can offer protection that is equal to or better than conventional fabrics that are heavier or thicker.

were subjected to puncture force using an ASTM-F1342 probe as described in Example 1. Eight repetitions were conducted for each fabric, and the data are summarized in FIGS. 9-12 and Table 3. The box plots in FIGS. 9, 10, and 12 summarize the tests performed on each sample as follows: the small square in each box is the mean puncture force, the height of the box represents one standard deviation above and below the mean, the whiskers indicate the maximum and minimum recorded puncture force, and the horizontal line in the middle of the box is the median.

Figure 9:
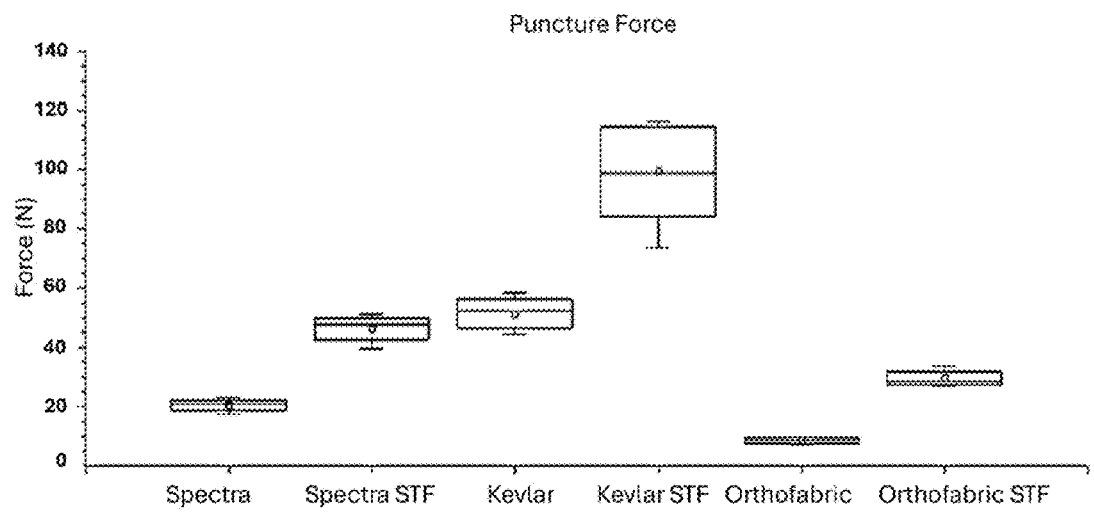
FIG. 9 is a box plot depicting the ASTM F-1342 probe puncture force for neat (untreated) fabrics versus STF-intercalated fabrics. The x-axis represents, from left to right, neat SPECTRA fabric, STF-intercalated SPECTRA fabric, neat KEVLAR fabric, STF-intercalated KEVLAR fabric, neat orthofabric, and STF-intercalated orthofabric. The y-axis represents the amount of force in newtons (N). The small square in each box is the mean puncture force. The height of the box represents one standard deviation above and below the mean. The horizontal line in the middle of the box is the median. The whiskers indicate the maximum and minimum recorded puncture force. N, newton.
Figure 10:
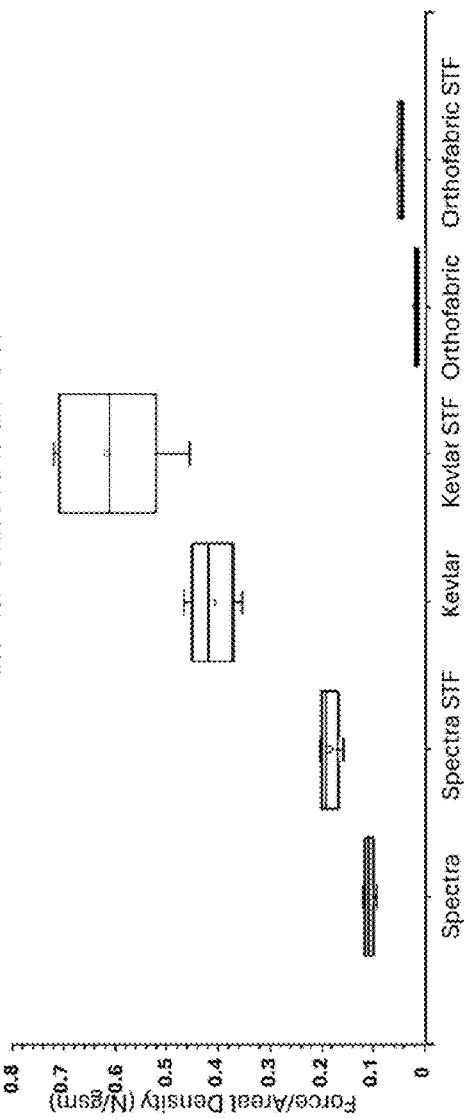
FIG. 10 is a box plot depicting the mass-normalized ASTM F-1342 probe puncture force for neat (untreated) fabrics versus STF-intercalated fabrics. The x-axis represents, from left to right, neat SPECTRA fabric, STF-intercalated SPECTRA fabric, neat KEVLAR fabric, STF-intercalated KEVLAR fabric, neat orthofabric, and STF-intercalated orthofabric. The y-axis represents the amount of force applied per areal density (N/gsm). The small square in each box is the mean puncture force/areal density. The height of the box represents one standard deviation above and below the mean. The horizontal line in the middle of the box is the median. The whiskers indicate the maximum and minimum recorded puncture force/areal density. N, newton; gsm, grams per square meter.

The puncture resistance data for the silicone-based STF-intercalated fabrics is provided in FIGS. 9 and 10 and Table 3. Addition of silicone-based STF increased the puncture force for all three of the selected textiles. The KEVLAR fabric is specifically designed for protection against fine puncture threats and it was found to have the highest absolute puncture force. Neat orthofabric had the lowest initial puncture force, which is attributed to the relatively open weave. However, STF treatment had the largest effect on the puncture resistance of the orthofabric, increasing the average puncture force by nearly 250%. A notable result for all three fabrics was that the minimum puncture force for each STF-treated textile exceeded the maximum puncture force for the neat textile. This indicates that the STF treatment effectively suppressed the puncture modes associated with low force punctures, namely windowing and yarn pull-out/slippage.

TABLE 3

Percent Increase in Puncture Force of Silicone-based STF-Intercalated Fabrics.

| | Force (N) to Puncture - Neat | | | | Force (N) to Puncture - STF | | | | |
| --- | --- | --- | --- | --- | --- | --- | --- | --- | --- |
| | Ave. | Max. | Min. | s.d. | Ave. | Max. | Min. | s.d. | % Incr. |
| SPECTRA 1000 | 20.5 | 22.8 | 17.5 | 1.5 | 46.2 | 50.8 | 39.2 | 3.6 | 125 |
| KEVLAR 779 | 51.4 | 58.2 | 44.2 | 4.8 | 99.3 | 116.1 | 73.4 | 15.2 | 93.3 |
| Orthofabric | 8.5 | 9.7 | 6.8 | 1.0 | 29.5 | 33.4 | 26.9 | 2.1 | 246 |

N, newton; Ave., average force; Max., maximum force recorded; Min., minimum force recorded; s.d., standard deviation; % Inc., percent increase.

TABLE 2

Mass Uptake for STF-Intercalated Fabrics.

| Fabric | Neat Weight (g/m²) | Post-treatment Weight (g/m²) | Absolute Weight (g/m²) | % Increase |
| --- | --- | --- | --- | --- |
| Silicone based | | | | |
| KEVLAR 779 | 194 | 252 | 58 | 30 |
| SPECTRA 1000 | 125 | 161 | 36 | 29 |
| Orthofabric | 518 | 623 | 105 | 20 |
| MAC based | | | | |
| KEVLAR 779 | 194 | 223 | 29 | 15 |
| SPECTRA 1000 | 125 | 142 | 17 | 13 |
| Orthofabric | 518 | 554 | 36 | 9 | g/m², grams per square meter.

Example 3. Puncture Resistance of STF-Intercalated Fabrics

To measure puncture-resistance of the STF-intercalated fabrics provided herein, puncture force analysis was performed on the silicone-based and MAC-based fabrics. STF-intercalated fabric and untreated fabric (neat) specimens One way to increase puncture force is to simply add mass to the sample, however the increase in puncture force for conventional materials is roughly proportional to the increase in mass. In contrast, STF treatment is a mass-effective means for increasing the puncture resistance through modification of the textile failure mode (i.e. change from windowing to yarn breakage). The mass-normalized puncture force provided a confirmation that the STF is effective at increasing puncture resistance in a manner beyond the simple addition of mass. A 20-30% increase in mass led to a 93-246% increase in puncture force for the three primary fabrics. The mass-normalized puncture force for the neat and silicone-based STF-intercalated samples are compared in FIG. 10. As shown in the non-normalized puncture data, the minimum mass-normalized puncture force for the STF materials exceeded the maximum force needed to puncture the neat fabrics. Thus, the STF-treated materials offer an increase in puncture force at equal weight, or alternatively, offer the opportunity to provide protection equivalent to current materials in a thinner, lighter structure.

Figure 11:
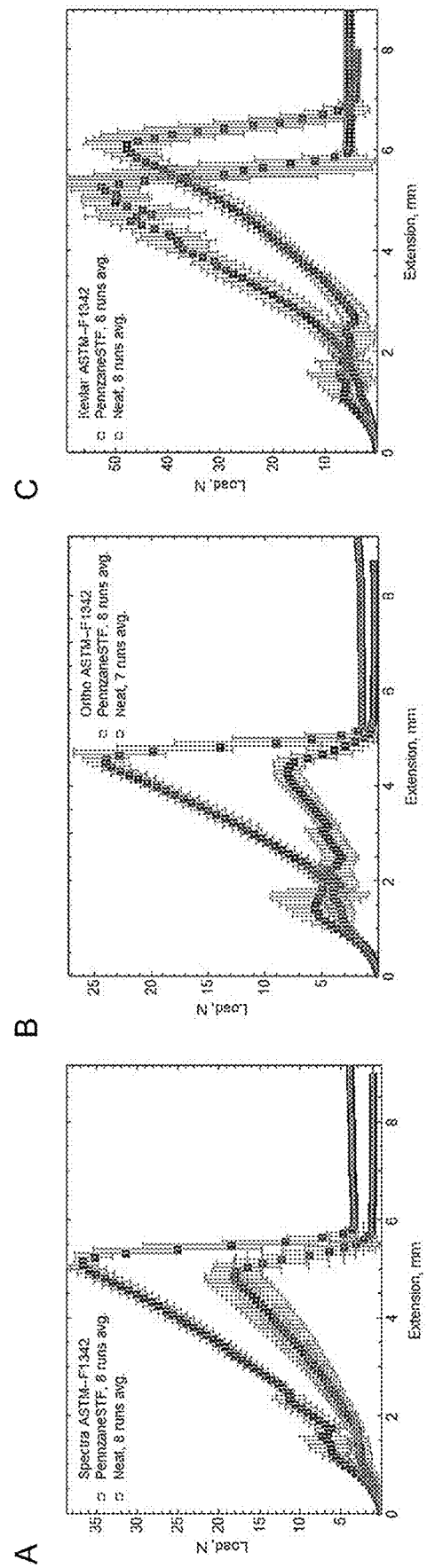
FIG. 11 is a graph showing the ASTM F-1342 probe puncture force for neat (untreated) fabrics versus STFhc-intercalated fabrics. The probe puncture data is shown for neat (top line) versus STFhc-intercalated (bottom line) SPECTRA (panel A), orthofabric (panel B), and KEVLAR (panel C). The y-axis represents the load applied to the fabric, and the x-axis represents the extension length of the fabric in millimeters (mm). N, newton; hc, hydrocarbon.
Figure 12:
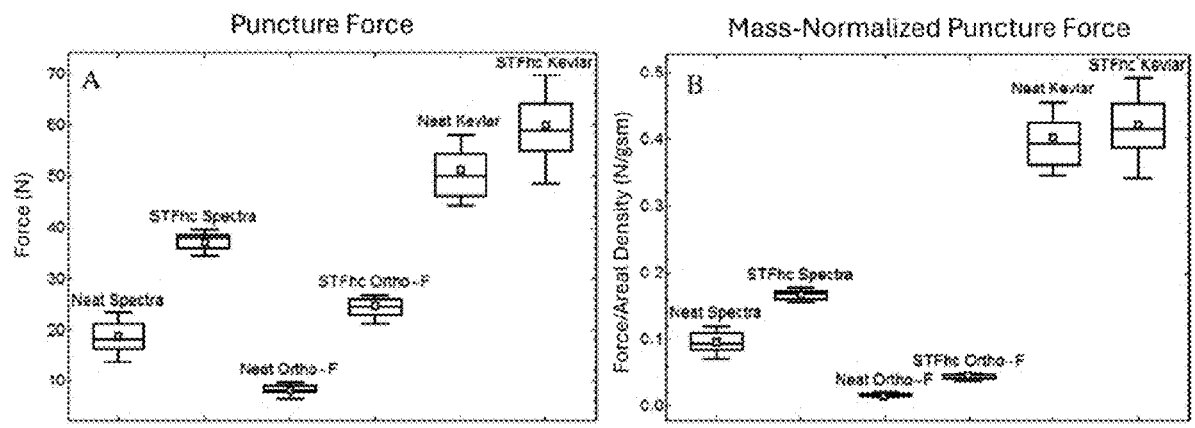
FIG. 12 are box plots depicting ASTM F-1342 probe puncture force data for neat (untreated) fabrics versus STFhc-intercalated fabrics. Panel A is the puncture force data, and Panel B is the mass-normalized data. In each plot, the x-axis represents, from left to right, neat SPECTRA fabric, STFhc-intercalated SPECTRA fabric, neat orthofabric, and STFhc-intercalated orthofabric, neat KEVLAR fabric, and STFhc-intercalated KEVLAR fabric. The y-axis represents the force applied (panel A) or the force applied per areal density (panel B). The small square in each box is the mean puncture force. The height of the box represents one standard deviation above and below the mean. The horizontal line in the middle of the box is the median. The whiskers indicate the maximum and minimum recorded puncture force. N, newton; gsm, grams per square meter; hc, hydrocarbon.

Turning to the low-outgassing MAC-based formulation, the addition of STFhc increased the puncture force for the SPECTRA and orthofabric, but the increase for the KEVLAR was not statistically significant (see FIGS. 11 and 12).

The STFhc treatment had the largest effect on the puncture resistance of the orthofabric, increasing the average puncture force by nearly 198%. As was the case with the silicone-based STF, a notable result for SPECTRA and orthofabric was that the minimum puncture force for each STFhc-treated textile exceeded the maximum puncture force for the neat textile, an indicator of highly effective STF intercalation. A 9-15% increase in mass led to a 102-198% increase in puncture force for STFhc-intercalated SPECTRA and STFhc-intercalated orthofabric. The mass-normalized puncture force for the neat and STFhc-treated samples are compared in FIG. 12.

Example 4. Cut Resistance of STF-Intercalated Fabrics

Figure 13:
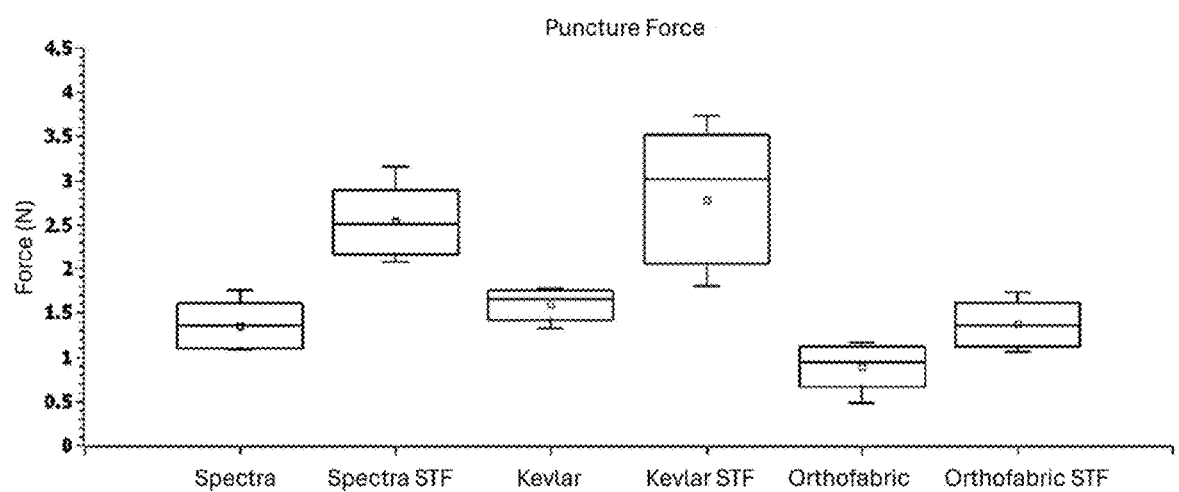
FIG. 13 is a box plot depicting the ASTM F-2878/21G needle cut-puncture force for neat (untreated) fabrics versus STF-intercalated fabrics. The x-axis represents, from left to right, neat SPECTRA fabric, STF-intercalated SPECTRA fabric, neat KEVLAR fabric, STF-intercalated KEVLAR fabric, neat orthofabric, and STF-intercalated orthofabric. The y-axis represents the amount of force applied to the fabric. The small square in each box is the mean cut-puncture force. The height of the box represents one standard deviation above and below the mean. The horizontal line in the middle of the box is the median. The whiskers indicate the maximum and minimum recorded cut-puncture force. N, newton.
Figure 14:
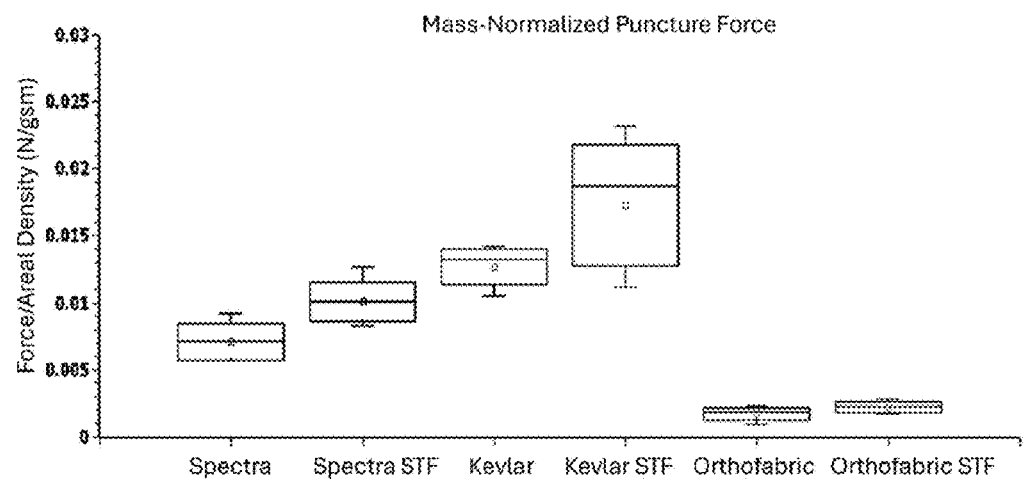
FIG. 14 is a box plot depicting the mass-normalized ASTM F-2878/21G needle cut-puncture force for neat (untreated) fabrics versus STF-intercalated fabrics. The x-axis represents, from left to right, neat SPECTRA fabric, STF-intercalated SPECTRA fabric, neat KEVLAR fabric, STF-intercalated KEVLAR fabric, neat orthofabric, and STF-intercalated orthofabric. The y-axis represents the amount of force applied per areal density. The small square in each box is the mean cut-puncture force. The height of the box represents one standard deviation above and below the mean. The horizontal line in the middle of the box is the median. The whiskers indicate the maximum and minimum recorded cut-puncture force. N, newton; gsm, grams per square meter.

Puncture by mixed-mode penetrators, such as sharp edges of metal, was assessed using a 21 gauge hypodermic needle to simulate an aggressive cut-puncture threat (see Example 1). Hypodermic needles have a barrel diameter less than 1 mm and contain a sharp, beveled tip for cutting. Eight puncture tests were performed on STF-intercalated fabric, and a new needle was used for each test. The cut-puncture results for the silicone-based STF-intercalated fabrics are summarized in FIG. 13 and Table 4. The largest relative increase in cut-puncture force with silicone-based STF treatment was exhibited by the SPECTRA fabric. The percent increase in cut-puncture resistance was consistent with the trend in cut resistance for the fibers that make up each textile. As STF suppressed windowing and changed the puncture mode to cutting/breakage of fibers, the ultimate cut resistance of the fibers was a major factor that determined the final cut-puncture resistance of the STF treated materials. The SPECTRA fibers had the highest resistance to cut and thus the SPECTRA fabric stood to gain the most from STF treatment and elimination of windowing failure. STF treatment improved the cut-puncture resistance of the orthofabric by over 50%. The mass-normalized cut-puncture resistance of the textiles is shown in FIG. 14. All of the silicone-based STF-treated fabrics had a higher mass-normalized cut-puncture resistance than the neat fabrics.

with the different treatments. The silicone oil STF has polydisperse silica of approximately 100 nm average size and exhibited good puncture resistance for both SPECTRA and KEVLAR fabrics. The hydrocarbon formulations with monodisperse 500 nm particles had notably better response when added to SPECTRA. Depending on the particle size, shape, or hardness, and fiber parameters such as denier and hardness, the particles can gouge the fibers during impact, processes that can improve energy dissipation and force to penetrate.

Example 5. Flexibility of STF-Intercalated Fabrics

Figure 17:
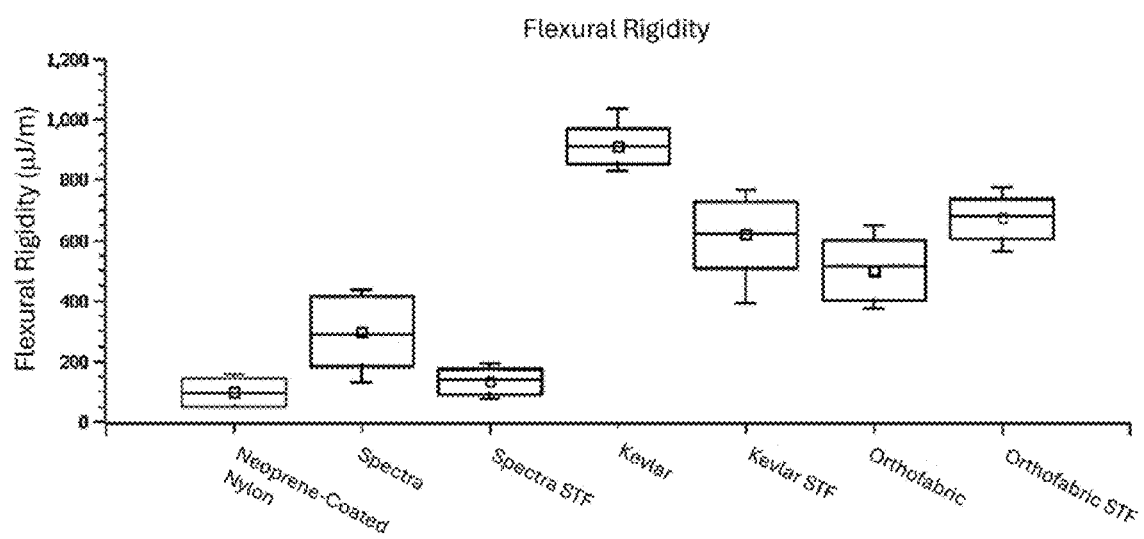
FIG. 17 is a box plot depicting the flexural rigidity for neat (untreated) fabrics versus STF-intercalated fabrics. The x-axis represents, from left to right, neat neoprene-coated NYLON, neat SPECTRA fabric, STF-intercalated SPECTRA fabric, neat KEVLAR fabric, STF-intercalated KEVLAR fabric, neat orthofabric, and STF-intercalated orthofabric. The y-axis represents the amount of flexural rigidity (µJoule/meter). The small square in each box is the mean flexural rigidity. The height of the box represents one standard deviation above and below the mean. The horizontal line in the middle of the box is the median. The whiskers indicate the maximum and minimum recorded flexural rigidity.
Figure 18:
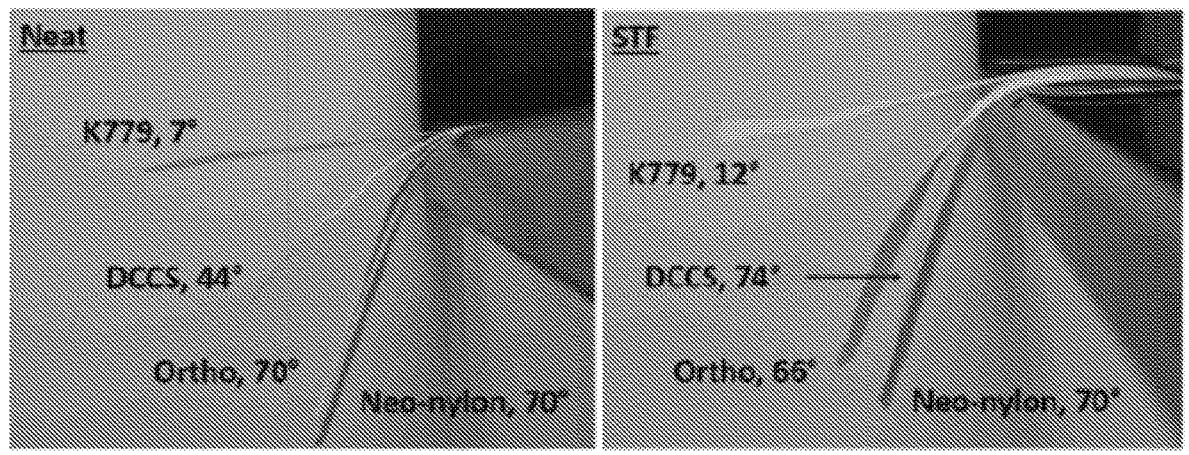
FIG. 18 are photographs of a bending angle test showing the flexibility of neat (left panel) versus STF-intercalated (right panel) fabrics. K799, KEVLAR 799 fabric; DCCS, SPECTRA 1000 fabric; Ortho, orthofabric; Neo-nylon, neoprene-coated NYLON fabric. The bending angle (in degrees) is indicated next to each fabric label.

In addition to the mass-efficient improvement in puncture properties, STF treatment did not significantly stiffen the fabric. The ASTM D-1388 Standard Test Method for Stiffness of Fabrics was used to measure the rigidity (i.e., the extent to which fabric resists bending). A summary of the rigidity data for the silicone-based STF-intercalated fabrics are shown in FIG. 17. One complication of the D-1388 test is that the measured rigidity is influenced by the weight of the textile. The data indicated that STF treatment decreased the flexural rigidity of SPECTRA and KEVLAR, and only slightly increased the flexural rigidity of the orthofabric. FIG. 18 shows a basic bending test in which the bending angle of the fabric was measured. The STF-treated SPECTRA had flexibility similar to the orthofabric and neoprene-coated Nylon.

Similar studies were carried out with the MAC-based STFhc-intercalated fabrics, which did not display any apparent difference in stiffness as compared to the silicone-based STF-treated materials.

Example 6. Dust Resistance of STF-Intercalated Fabrics

To measure the capability of the STF-intercalated fabrics to prevent dust contamination, a regolith penetration test utilizing a JSC Mars-1A simulant dust particle was used to evaluate both neat and STF-treated fabrics to determine how easily dust can penetrate through the layers of fabrics. Visual

TABLE 4

Percent Increase in Cut-Puncture of Silicone-based STF-Intercalated Fabrics.

| | Force (N) to Cut-Puncture - Neat | | | | Force (N) to Cut-Puncture - STF | | | | |
|---|---|---|---|---|---|---|---|---|---|
| | Ave. | Max. | Min. | s.d. | Ave. | Max. | Min. | s.d. | % Incr. |
| SPECTRA 1000 | 1.3 | 1.7 | 1.1 | 0.3 | 2.5 | 3.2 | 2.1 | 0.4 | 88 |
| KEVLAR 779 | 1.6 | 1.8 | 1.3 | 0.2 | 2.8 | 3.7 | 1.8 | 0.7 | 75 |
| Orthofabric | 0.89 | 1.2 | 0.5 | 0.2 | 1.4 | 1.7 | 1.1 | 0.2 | 54 |

N, newton; Ave., average force; Max., maximum force recorded; Min., minimum force recorded; s.d., standard deviation; % Inc., percent increase.

Figure 15:
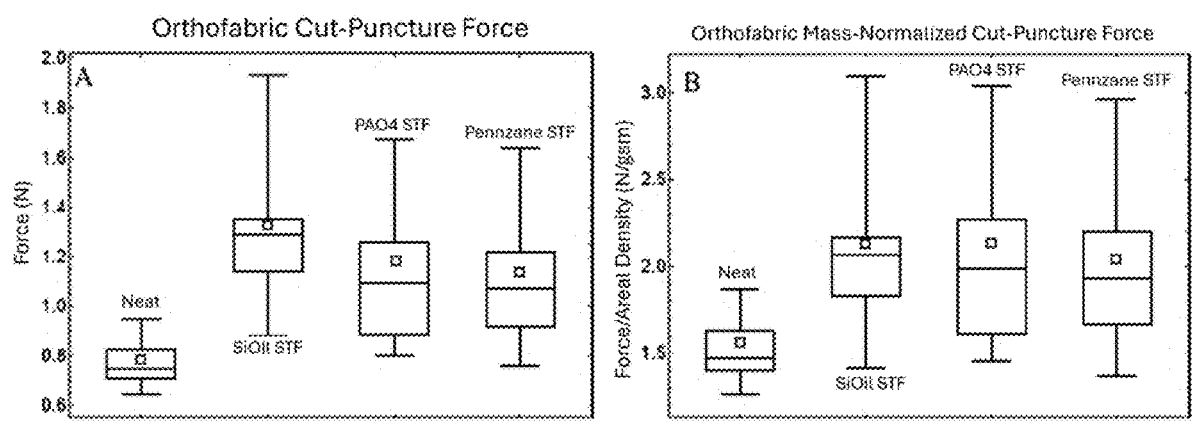
FIG. 15 are box plots depicting cut-puncture data for neat versus treated orthofabric. Panel A is the cut-puncture force, and panel B is the mass-normalized cut-puncture force. The samples in each box plot, from left to right, are neat orthofabric, silicone-based STF-intercalated orthofabric (SiOil STF), poly-alpha olefin-based STF-intercalated orthofabric (POA4 STF), and MAC-based STF-intercalated orthofabric (Pennzane STF). The y-axis represents the force applied (panel A) or the force applied per areal density (panel B). The small square in each box is the mean cut-puncture force. The height of the box represents one standard deviation above and below the mean. The horizontal line in the middle of the box is the median. The whiskers indicate the maximum and minimum recorded cut-puncture force. N, newton; gsm, grams per square meter.
Figure 16:
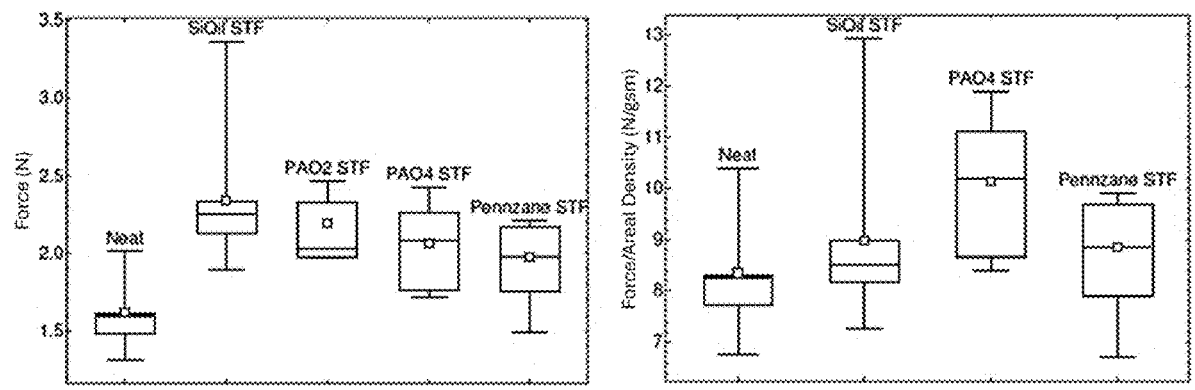
FIG. 16 are box plots depicting cut-puncture data for neat versus treated SPECTRA fabric. Panel A is the cut-puncture force, and panel B is the mass-normalized cut-puncture force. The samples in each box plot, from left to right, are neat SPECTRA fabric, silicone-based STF-intercalated SPECTRA fabric (SiOil STF), poly-alpha olefin-based STF-intercalated SPECTRA fabric (POA2 and/or POA4 STF), and MAC-based STF-intercalated SPECTRA fabric (Pennzane STF). The y-axis represents the force applied (panel A) or the force applied per areal density (panel B). The small square in each box is the mean cut-puncture force. The height of the box represents one standard deviation above and below the mean. The horizontal line in the middle of the box is the median. The whiskers indicate the maximum and minimum recorded cut-puncture force. N, newton; gsm, grams per square meter.
Figure 19:
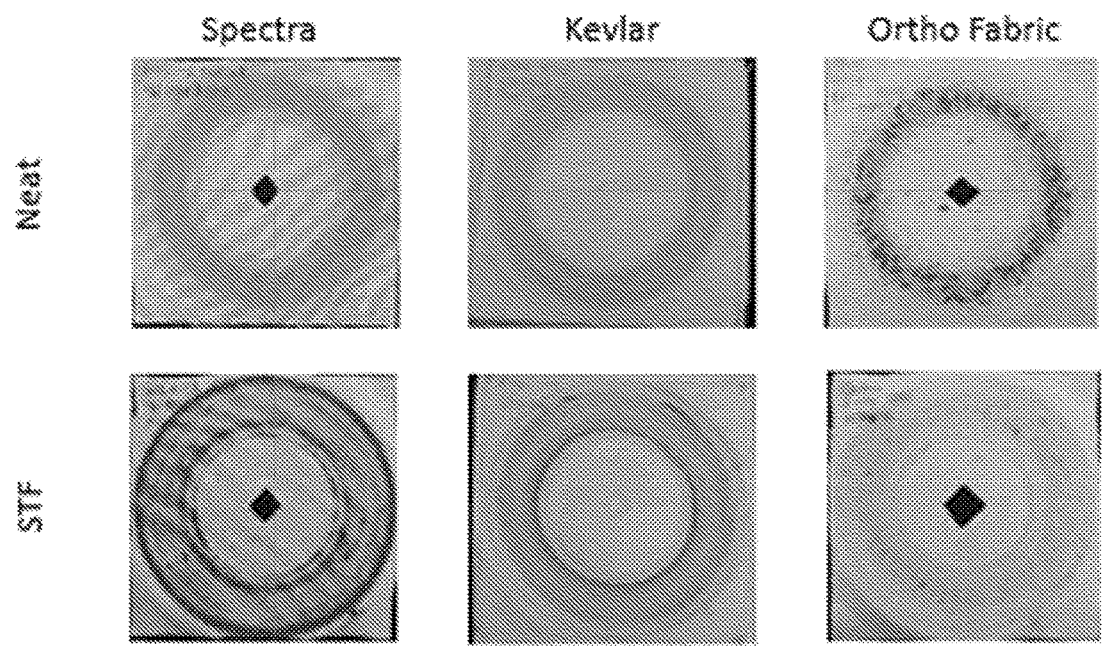
FIG. 19 depicts results of the dust resistance tests. The images show the wear path for neat versus STF-intercalated SPECTRA fabric, KEVLAR fabric, and orthofabric after 10,000 rotations with simulant. The presence of simulant appears as dark granules or lines in the photographs.
Figure 20:
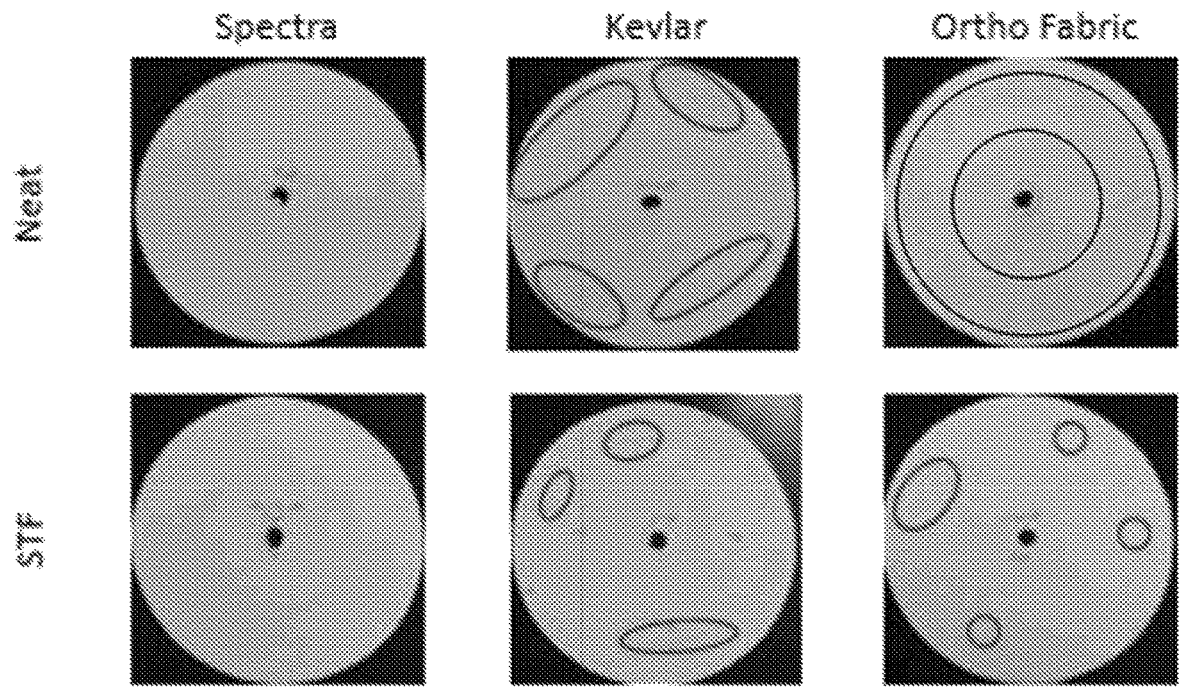
FIG. 20 depicts results of the dust resistance tests. Shown are images of the witness paper for neat versus STF-intercalated SPECTRA fabric, KEVLAR fabric, and orthofabric after 10,000 rotations with simulant. The markings indicate where the JSC Mars-1A simulant penetration was observed.

As observed with the silicone formulations, the low outgassing STFhcs (PENNZANE, POA2, or POA4) were also effective at increasing the resistance to cut-puncture. FIG. 15 shows a comparison of the puncture force for orthofabric treated with three different STFs (silicon-based (SiOil), MAC-based (PENNZANE), poly-alpha olefin-based (POA4)). The hydrocarbon-based formulations (also a different particle phase) achieved a similar average, and mass-normalized puncture force as the silicone STF, indicating that the STF properties can be tuned to meet environmental and other requirements and still provide puncture benefits. FIG. 16 shows the puncture results for SPECTRA observations, photographs, and micrographs were used to assess how the JSC Mars-1A simulant interacted with and penetrated each fabric. The red color of the simulant had good contrast with the white witness paper placed behind the test specimen and visual observation of the witness paper was often adequate to determine if simulant had penetrated. FIGS. 19 and 20 show the top of the specimens and the witness papers, respectively. The neat fabrics had a relatively uniform deposition of simulant into the fabric along the circular wear path. The STF-intercalated SPECTRA and KEVLAR fabrics had slightly darker zones of simulant accumulation that were the result of the STF acting to "bind"

the simulant. This effect acted to increase the effective particle size, thereby hindering penetration of the simulant through the weave. The tight weave of the SPECTRA fabric was effective at preventing simulant penetration, both with and without STF. There was no visible simulant deposition on the witness paper. Neat KEVLAR fabric did allow for some light simulant penetration, which was visibly reduced by adding STF.

On the other hand, the neat and STF orthofabric produced results opposite that of the SPECTRA and KEVLAR results. In contrast to the SPECTRA and KEVLAR tests, the wear path for the orthofabric appears darker for the neat fabric as compared to the STF-treated fabric. The weave of the orthofabric is more open than the other two fabrics and the darker color was merely the result of more simulant accumulating in the fibers and yarns. This was also confirmed by the witness paper, which showed that far more simulant was able to work into and through the neat orthofabric than for the other two textiles. STF treatment of the orthofabric was effective at limiting the amount of simulant that entered and eventually penetrated the fabric. Due to the non-wetting properties, there was likely very little STF located in the outermost Gore-Tex portion of the Orthofabric. This likely prevented the adhesion of simulant and darkening that was seen for the STF-treated SPECTRA and STF-treated KEVLAR. However, the STF present in the lower NOMEX-KEVLAR layer appeared to effectively hinder simulant penetration and the amount of simulant visible on the witness paper was markedly reduced compared to the neat orthofabric.

The improvement in dust penetration resistance of the orthofabric with STF treatment is advantageous because orthofabric is the outermost layer of the EPG. Preventing regolith from entering and abrading the inner layers of the spacesuit preserves those layers so they can perform their designated protection and life-support functions. STF-treatment also prevented simulant from collecting between loose threads on the surface of the orthofabric. This would help prevent simulant from abrading the threads during repeated flexion and possibly degrading the outer layer of the spacesuit. Combined with the 246% increase in puncture resistance noted previously, STF treatment showed excellent improvement in the protection and durability of the orthofabric.

Figure 21:
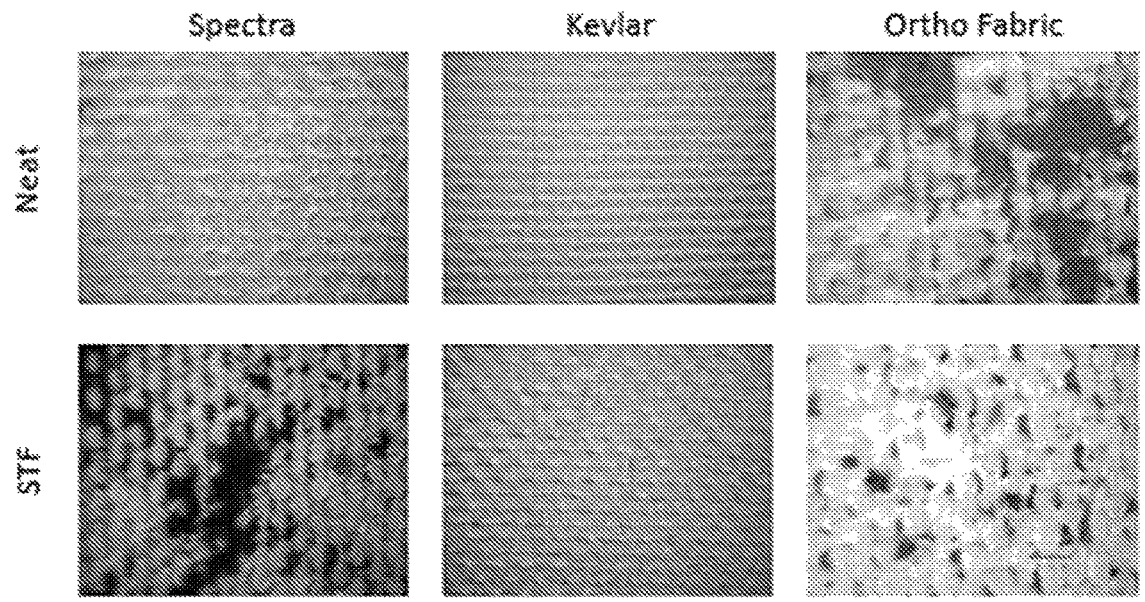
FIG. 21 are optical microscope images of neat versus STF-intercalated SPECTRA fabric, KEVLAR fabric, and orthofabric after 10,000 rotations in contact with fabric-coated CS-0 wheels. Simulant (0.3 grams) was placed on the surface of the test specimen prior to testing. The dark areas indicate the presence of simulant. All scale bars are 1 mm.
Figure 22:
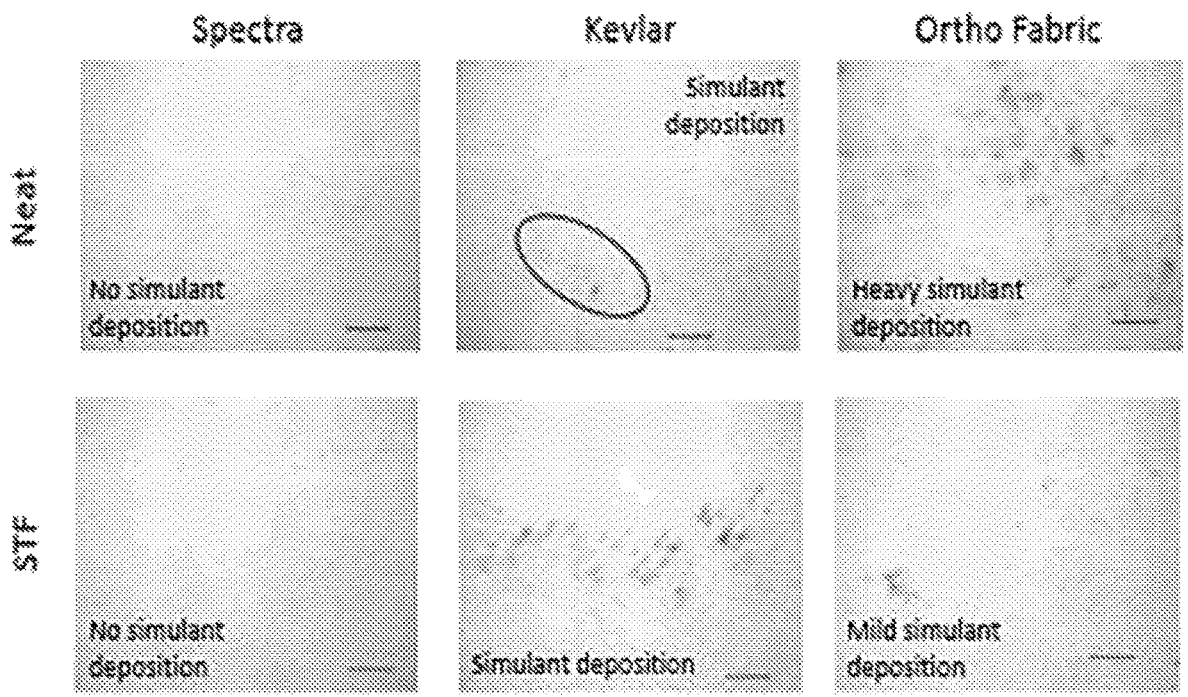
FIG. 22 are microscope images of the witness paper for neat versus STF-intercalated SPECTRA fabric, KEVLAR fabric, and orthofabric. Simulant deposition indicated by dark areas and markings. All scale bars are 1 mm.

Micrographs were used to probe the mechanism of simulant penetration and identify features like clumping or filtering of different particle sizes. FIGS. 21 and 22 show micrographs of the surface of the test specimen after testing and the witness paper after testing, respectively. FIG. 21 illustrates how the intercalation of STF into the SPECTRA fabric caused agglomeration of the simulant on the surface of the textile within the "valleys" between yarns. The neat orthofabric had significant accumulation of dry simulant on the surface and embedded into the fabric. The STF-intercalated orthofabric exhibited significantly reduced surface accumulation and some darkening of the simulant areas that are present, suggesting that the STF acted to agglomerate and hinder penetration of the simulant.

An alternate experiment was conducted to investigate whether the simulant causes visible damage to the orthofabric and Mylar layers and if the simulant was capable of "wearing through" these layers via abrasion. The samples did not fail after 250,000 cycles, however the normal force exerted by the wheel was not extremely high, nor was there significant material flexion in the test.

Figure 23:
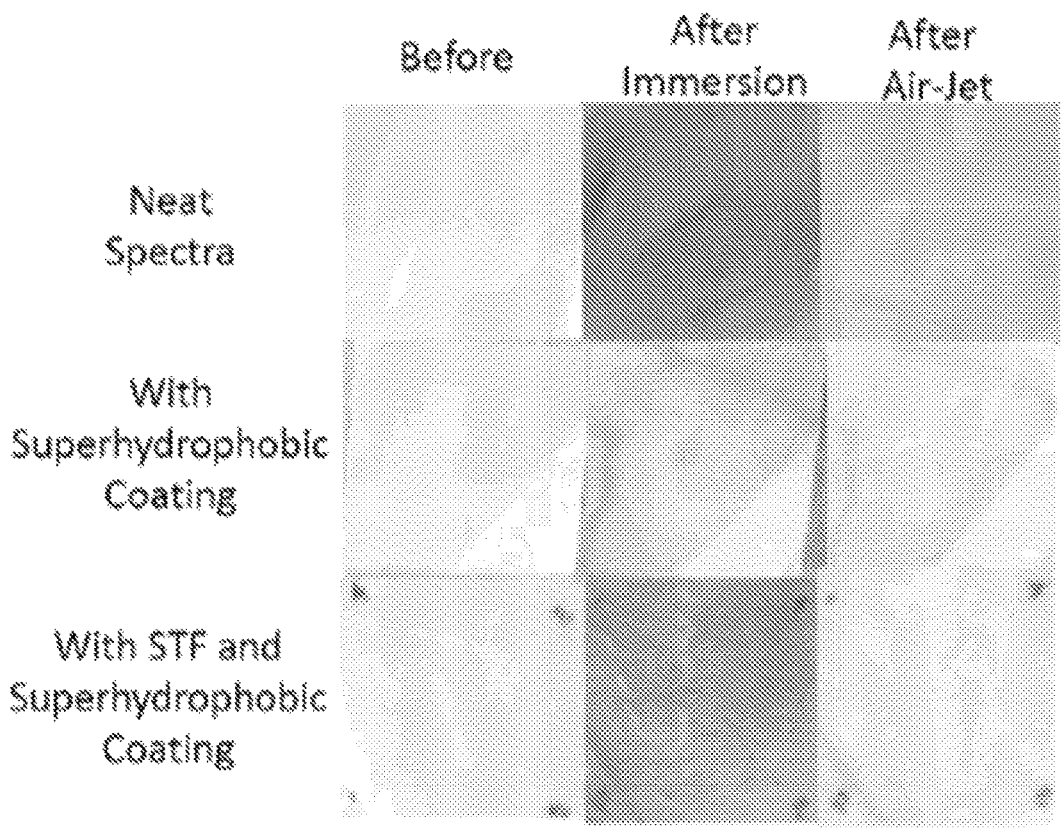
FIG. 23 depicts the dust resistance and self-cleaning functionally provided by adding a superhydrophobic coating to SPECTRA fabric. The left column shows the samples prior to immersion in regolith simulant. The middle column shows the samples after immersion. The right column shows the samples after air jet cleaning. Shown are images for neat SPECTRA fabric (top row), superhydrophobic coated SPECTRA fabric (middle row), and superhydrophobic coated and STF-intercalated SPECTRA fabric (bottom row).

A second approach to dust mitigation was found using a commercially available superhydrophobic coating (HYDROBEAD) to impart self-cleaning properties and prevent dust adhesion. The coating mitigated adhesion between the dust and fabric by modifying the surface energy of the fibers, thereby allowing the simulant to be easily removed from the surface of the fabric. The effectiveness of the superhydrophobic coatings was evaluated using a method based on prior testing at Goddard Space Flight Center by O'Connor (2015). Textile samples were immersed in a dish containing an excess of JSC Mars-1A simulant and agitated for 30 seconds. Samples were photographed after immersion and were then subjected to a 30 second air jet to test simulant removal. The results of dust immersion tests on SPECTRA fabric with and without the superhydrophobic coating are shown in FIG. 23. The superhydrophobic coating substantially reduced the amount of dust deposited on the SPECTRA fabric as compared to the SPECTRA fabric without the coating. After the air jet, the coated SPECTRA fabric had minimal discoloration, whereas the untreated material showed significant discoloration that indicated dust infiltration into the weave. The STF and superhydrophobic coated SPECTRA fabric picked up slightly more dust than the textile with the superhydrophobic coating alone, a result attributed to possible incomplete coating from the spray process. However, the coating and STF were effective at preventing dust infiltration into the weave and the simulant was very easily removed with the air jet.

Figure 24:
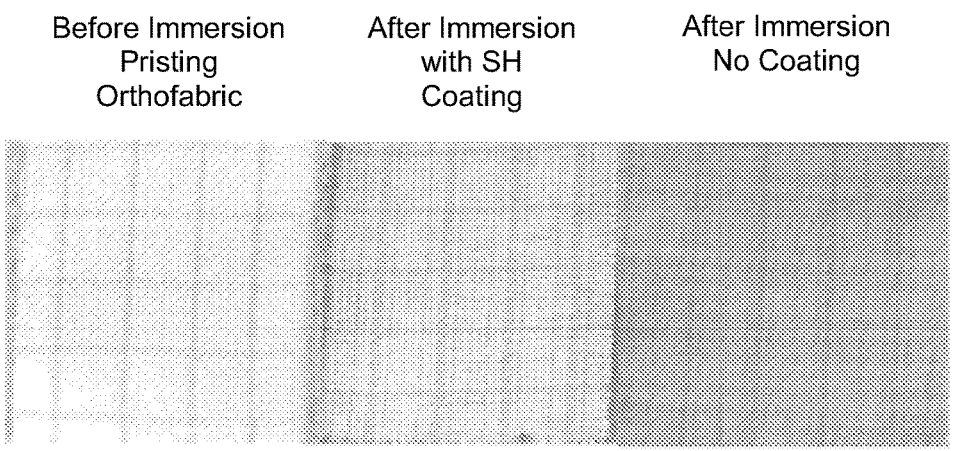
FIG. 24 shows the effects of superhydrophobic coating on the dust resistance of orthofabric. Samples are shown before (left panel) and after (middle and right panels) immersion in JSC Mars-1A simulant.
Figure 26:
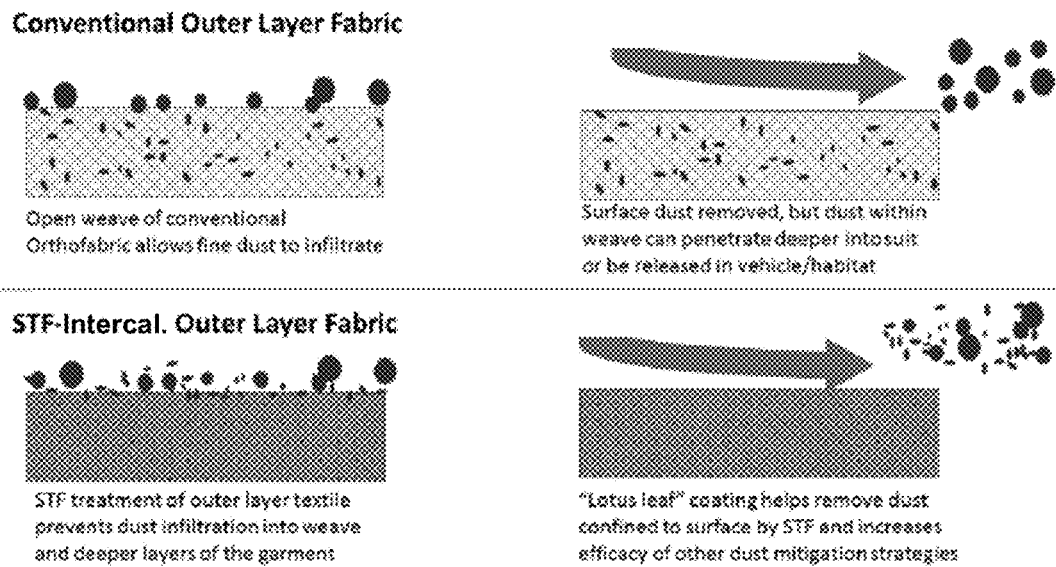
FIG. 26 is an illustration of STF-intercalation and superhydrophobic coatings for dust mitigation. The outer layer fabric of a conventional EPG is shown (top) with no treatment (left) versus treatment with superhydrophobic coating (right). In comparison, an STF-intercalated fabric outer layer is shown (bottom) with no treatment (left) versus treatment with superhydrophobic coating (right)

One limitation of the superhydrophobic coatings is that the coating is less effective for fabrics with a more open weave, such as the orthofabric. The superhydrophobic coating did not adhere to the PTFE outer face of the orthofabric, an expected result. A superhydrophobic coating applied to the rear/inner face of the orthofabric did result in a visible improvement in dust rejection properties compared to the neat fabric. FIG. 24 shows that the superhydrophobic coating reduced dust adhesion for the orthofabric. However, if the simulant was able to physically penetrate deep into the weave it can become physically trapped and difficult to remove, or it can penetrate down through the interior layers of the suit. The results of the Taber-based simulant penetration testing shown in FIG. 20 show that the STF prevented the simulant from penetrating deep into the SPECTRA fabric and orthofabric. Thus, the STF treatment and a superhydrophobic coating can work synergistically to create an outer layer textile that is very resistant to dust penetration. FIG. 26 illustrates the dust mitigation properties of an STF-intercalated fabric coated with a superhydrophobic coating as compared to the conventional outer layer fabric.

Importantly, the STF-treated and superhydrophobic coated textiles have a significant advantage over competing dust mitigation technologies in that there is no increase in stiffness and the increase in mass is relatively small. STF treatment adds about 10% weight to the orthofabric and the mass of the superhydrophobic coating is negligible. Other coatings, such as RTV, add weight and increase joint torque.

Example 7. Coarse Abrasion Resistance of STF-Intercalated Fabrics

Figure 25:
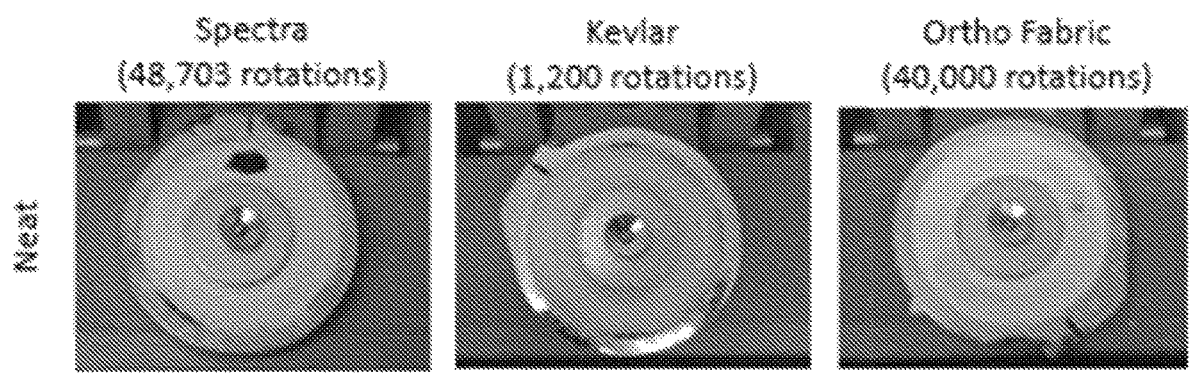
FIG. 25 shows images of untreated SPECTRA fabric, KEVLAR fabric, and orthofabric after coarse abrasive testing with Taber H-22 wheels. The number of wheel rotations for each fabric is indicated in parenthesis.

While regolith penetration and wear is a major issue for EPGs, resistance to coarse abrasive threats, like rocks, is also a significant performance attribute. Coarse abrasion resistance of candidate materials was evaluated using a Taber H-22 (ceramic oxide) wheel. SPECTRA fabric had the highest resistance to coarse abrasion and sustained over 45,000 cycles with the H-22 wheel. The KEVLAR fabric had much lower abrasion resistance and failed around 1,000 cycles. The relatively fine yarn and filament size that gives the KEVLAR fabric the superior puncture properties also lead to poor abrasion resistance. The orthofabric was moderately resistant to abrasion and failure was more complex than the other materials due to the multi-layer construction of the orthofabric. The outermost layer of the orthofabric was abraded away at approximately 20,000 cycles and the inner layer with the KEVLAR thread reinforcements did not completely abrade through until 40,000 cycles. FIG. 25 shows the specimens after failure in the abrasion tests.

Example 8. Superposition Model of TMG Designs Using STF-Intercalated Fabrics

Figure 27:
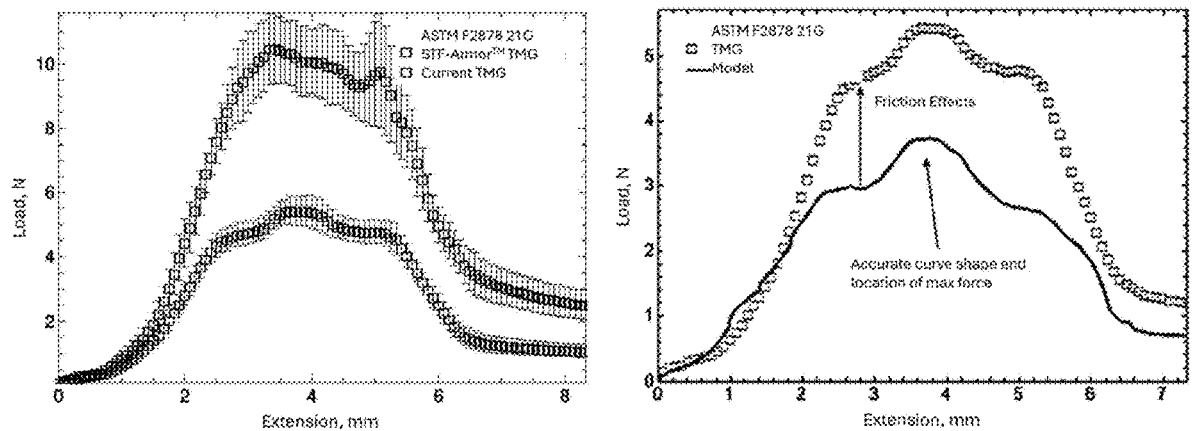
FIG. 27 are graphs showing the cut-puncture testing results on the multi-layer TMG articles. The left panel compares the cut-puncture resistance for the TMG containing a bi-layer absorber of STF-intercalated SPECTRA fabric and STF-intercalated KEVLAR fabric and an STF-intercalated orthofabric outer cover (top line) compared to the conventional multi-layer TMG lay-up (bottom line). The right panel illustrates the model predictions for the conventional TMG compared with validated test data.

A superposition model was developed to predict the relative performance of different lay-up concepts using the puncture curves from single layer ASTM F-2878 tests. Puncture curves for the individual layers of the TMG were measured, along with STF-variants of orthofabric and the candidate absorber layer KEVLAR, SPECTRA, and VECTRAN materials. The restraint layer was not included in this testing or modeling. The model accounts for sequential interactions of the puncture probe with the various lay-up layers to generate a predicted force versus displacement curve that can be used to evaluate different lay-up designs. Interlayer friction was not included, so the estimated puncture curves represented lower-bound estimates of lay-up puncture forces. Nonetheless, the model was found to accurately rank lay-up concepts and is a valuable tool to efficiently design lay-ups to meet a performance target subject to mass and thickness constraints. The model accurately predicted curve shapes, the displacement at which max force is achieved, and the quantitative percent improvement in puncture force expected for different designs. FIG. 27 shows the use and validation of the model that was used to achieve an improvement in puncture force. Multiple lay-up variants were modeled, with variables including whether the orthofabric was STF-treated, the type of absorber layer fabric(s), and the order materials in a 2-fabric absorber layer. Lay-ups were designed to have approximately the same mass and thickness as with standard materials. A lay-up consisting of STF-orthofabric, 7 layers of aluminized Mylar, and a bi-layer absorber with one layer of STF-intercalated KEVLAR fabric and one layer of STF-intercalated SPECTRA fabric was compared to a TMG with standard materials and a bi-layer absorber of neoprene coated Nylon as described in Jones et al., 2006.

The conventional lay-up had a weight of 1520 g/m$^2$ and the STF lay-up had a weight of 1421 g/m$^2$, a reduction of nearly 8%. Model predictions from single layer tests indicated that the STF-lay-up would have approximately 90% higher puncture force relative to the conventional lay-up. Testing on the assembled lay-ups found that the average cut-puncture forces of the STF and conventional lay-ups were 10.5N and 5.4N, respectively, a 98% increase for the STF lay-up. This testing proved that STF-intercalated fabrics used in EPGs can improve protection without compromising other suit requirements.

Example 9. Silicone Coating for Dust Resistance

The inventors research suggested that silicone coated VECTRAN was a promising shell fabric material. The continuous coating over the entire surface of the fabric is highly effective at preventing dust from penetrating through the fabric. However, commercially available silicone coatings were tacky and were found to strongly bind dust on the silicone surface. The inventors evaluated changes in processing methods, silicone formulation, and additives to improve the properties of the silicone coating for use as a shell material. All of the silicone coating experiments were conducted using VECTRAN 2241 as the coated substrate. Initial screening tests on different silicone options were conducted with untreated VECTRAN. Once the initial screening experiments on silicone processing, formulation, and/or additives were completed a second set of follow-up tests were performed using STF-treated VECTRAN to confirm that the silicone had good adhesion to the STF-treated substrate.

Figure 28:
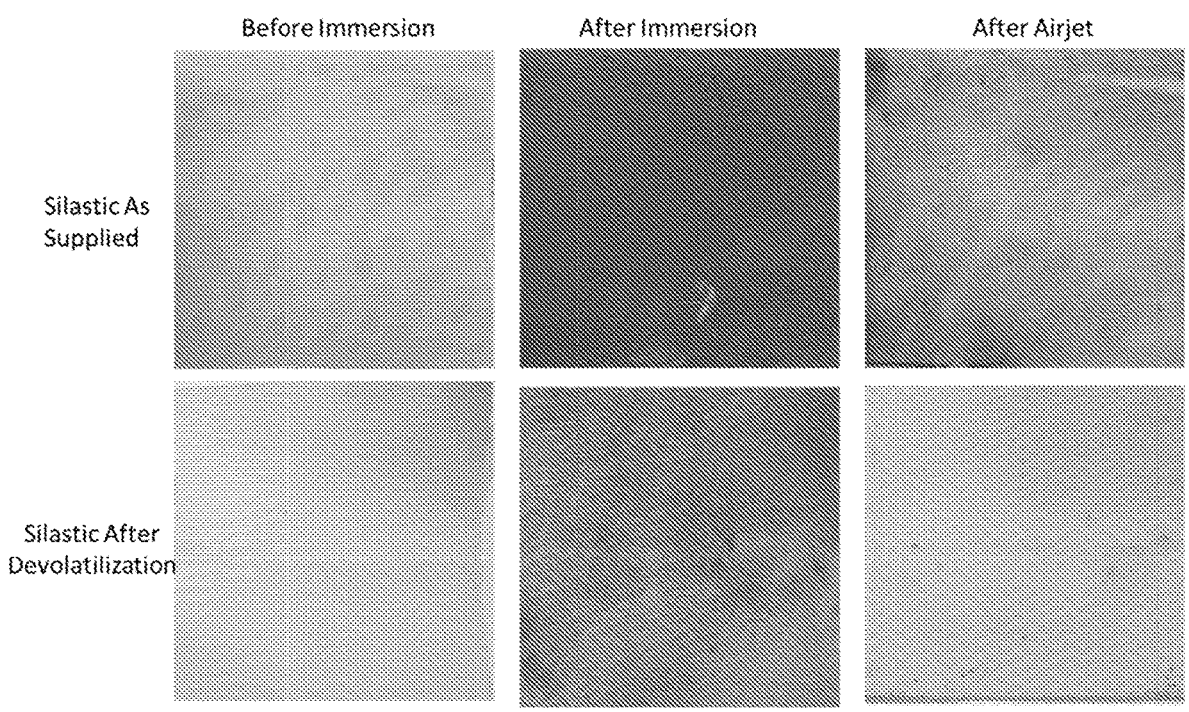
FIG. 28 are images showing the effect of devolatilization on the tackiness of silicone coatings on VECTRAN. The non-devolatilized specimens are shown (top row) before immersion (left column), after immersion (middle column) and after airjet (right column and compared to the devolatilized silicone (bottom row). The non-devolatilized specimen has high tack and strongly binds the simulant particles, whereas the devolatilized silicone has reduced tack and easily releases simulant under the airjet.

The first approach to reducing the tack of the silicone coating was to devolatilize the Part A of SILASTIC 9151 LSR (The Dow Chemical Company, Midland, MI, USA). The potential benefits of devolatilization for reducing tack were discovered in a prior NASA publication by Park and Clatterbuck ("Modifying a silicone potting compound for space flight applications" NASA Technical Report 19830039241 (1983), the entire content of which is hereby incorporated by reference). The uncatalyzed SILASTIC resin was placed under vacuum at 125° C. for 24 hours prior to mixing with the Part B catalyst. The silicone coating was applied using a doctor blade with micrometer height adjustment and then cured according to supplier instructions. FIG. 28 shows a comparison of the dust adhesion and removal testing on the silicone-coated VECTRAN with and without devolatilization. The devolatilized sample shows a clear reduction in tackiness and the amount of dust retained as compared to the VECTRAN coated with the as-supplied silicone. The silicone coating in these proof-of-concept tests was applied with the doctor blade at an effective height of 0 mm above the fabric surface. The resulting coating was very thin and the yellow color of the VECTRAN was partially visible through the silicone. A thicker coating was needed to impart the desired optical properties and to improve the durability of the silicone coating. The relationship between the height of the doctor blade during coating and weight of silicone added was investigated. The results are summarized in Table 5. A blade height of 0.15 mm above the STF-VECTRAN produced a final sample weight that was equal to Orthofabric. Ongoing testing will use a blade height of 0.1-0.15 mm to produce coatings of the desired thickness, weight, and durability.

TABLE 5

Effect of Coating Blade Height on Weight of Coated VECTRAN.

| Sample Type | Blade Height Above Fabric (mm) | Weight (g/m$^2$) | Weight (oz/yd$^2$) |
|---|---|---|---|
| Neat Fabric | n/a | 191 | 5.6 |
| STF Fabric | n/a | 216 | 6.4 |
| Coated STF Fabric | 0 | 322.1 | 9.5 |
| Coated STF Fabric | 0.15 | 475 | 14.0 |
| Coated STF Fabric | 0.25 | 622 | 18.3 |
| Coated STF Fabric | 0.4 | 820 | 24.2 |

Figure 29:
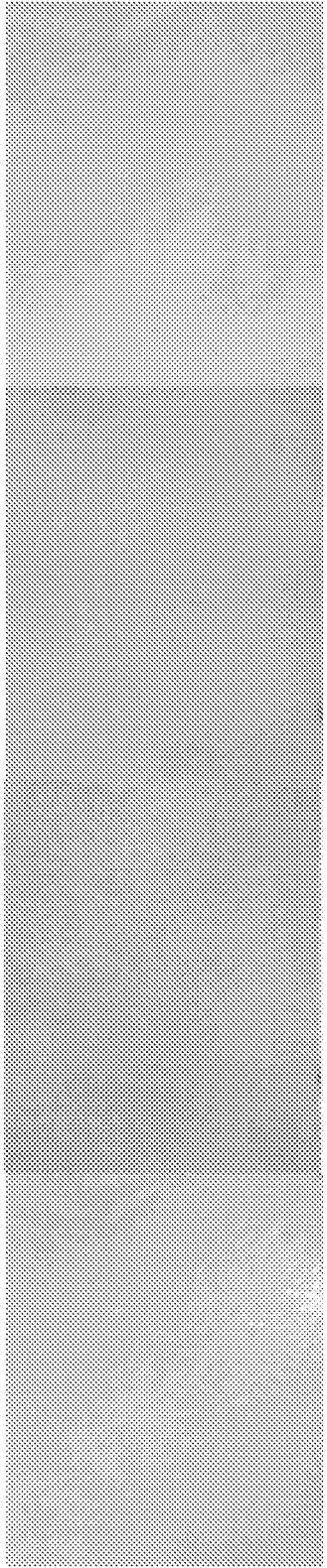
FIG. 29 are images showing the dust rejection and removal from the surface of 10 wt % TEFLON-filled devolatilized silicone. The TEFLON-modified silicone surface shows improved inherent dust rejection on immersion vs. unfilled silicone. Dust that remains is mostly removed by the airjet and the surface was restored to near-pristine condition with gentle brushing with a dry wipe (Kimwipe).
Figure 30:
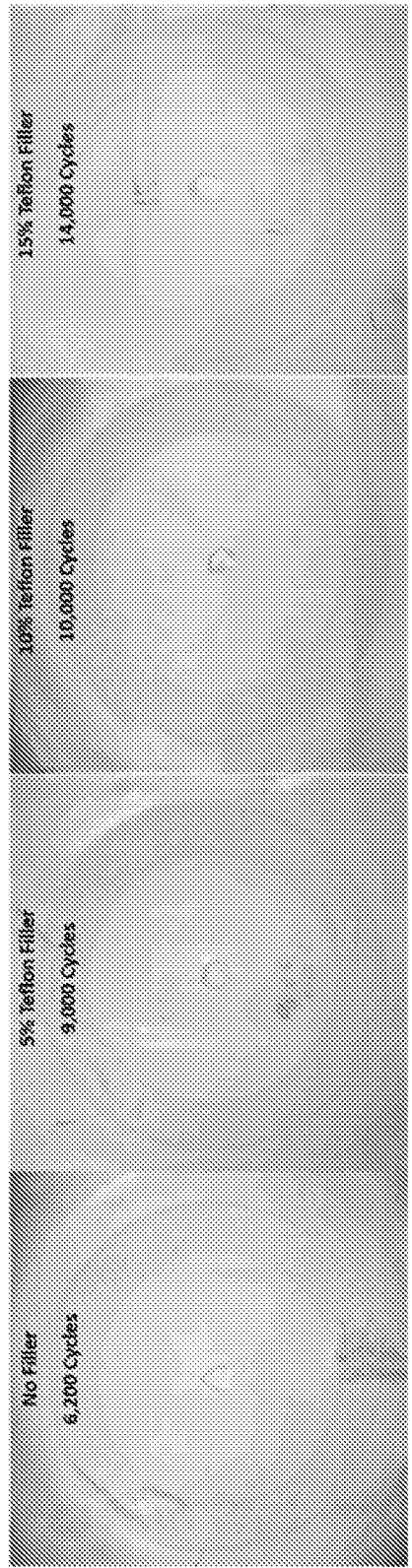
FIG. 30 are images showing that the addition of TEFLON particle filler improves the abrasion resistance of silicone coatings. After marked number of cycles on a Taber abraser using the H22 aluminum oxide wheel.
Figure 31:
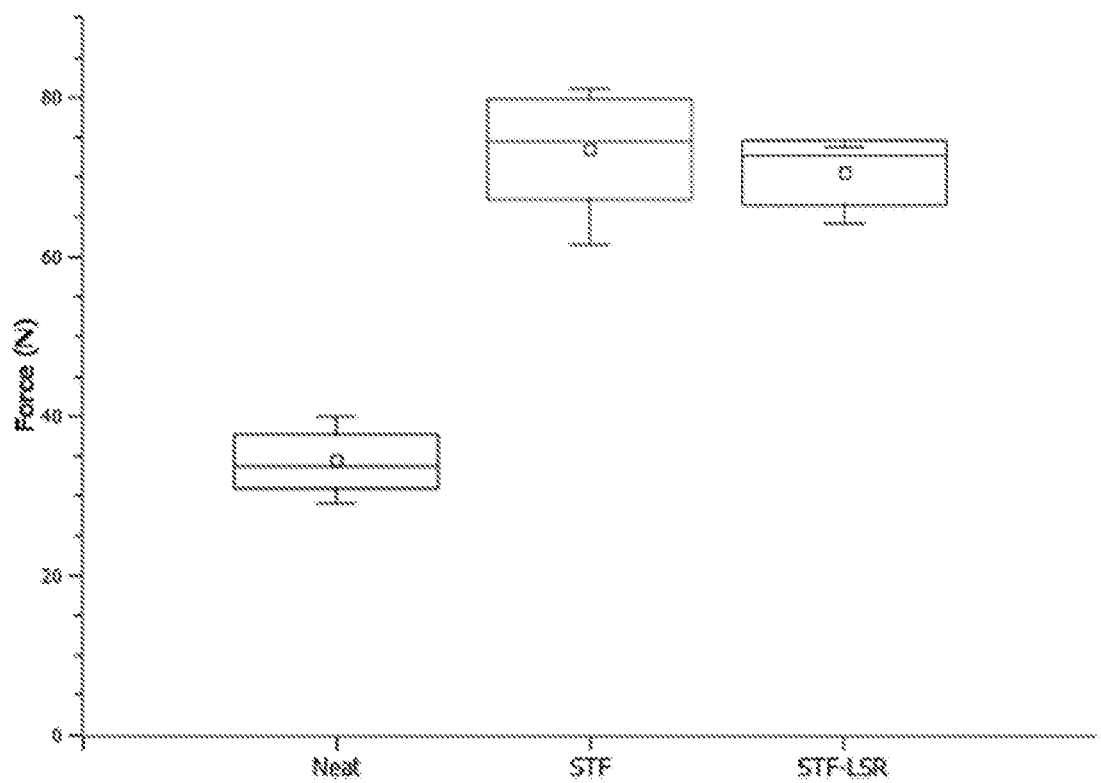
FIG. 31 is a graph of the ASTM F1342 puncture force for VECTRAN 2241. The silicone-coated STF VECTRAN (STF-LSR) retains nearly all of the enhancement in puncture force exhibited by the non-coated STF VECTRAN. STF VECTRAN exceeds the 50N puncture force target. The y-axis represents the puncture force in Newtons (N).

Additional modification of the silicone was investigated to further improve the optical, abrasion, and dust rejection properties beyond the improvements achieved by devolatilization. Particle fillers including silica, calcium carbonate, and TEFLON were tested. TEFLON particles (2 micron) were found to be most compatible with the materials and processing parameters. Optimization experiments were conducted to investigate the properties of silicone coatings with varying TEFLON particle loadings. The maximum TEFLON loading that successfully produced uniform coatings was 15 wt %. TEFLON content higher than 15 wt % led to spotty coatings, difficulties in uniformly dispersing the particles in the high-viscosity silicone precursor, and problems with adhesion of the coating to the substrate. TEFLON loadings of 10 wt % and 15 wt % were successfully applied to STF-treated VECTRAN without evidence of delamination and these loadings were selected for continuing testing. As shown in FIG. 29, the silicone coating with 10 wt % TEFLON effectively rejected and released simulant in the immersion test. Dust removal properties were improved with the addition of TEFLON to the devolatilized silicone. TEFLON-filled silicone coated VECTRAN samples were subjected to abrasion testing using the Taber abraser and H22 aluminum oxide wheels. The results are summarized in FIG. 30. Increasing the TEFLON loading led to an increase in the number of abrasion cycles to failure from 6,200 cycles for the unfilled silicone to over 14,000 for the 15 wt % TEFLON-filled silicone. Puncture testing was performed on STF-treated VECTRAN with the silicone coating applied to verify that the silicone does not negatively influence the puncture force. Standard puncture test results are shown in FIG. 31. There is a slight reduction in the maximum individual puncture result for the TEFLON-filled silicone coated STF VECTRAN (STF-LSR) compared to the same VECTRAN without coating. The reduction may be a result of reduced friction between the puncture probe and the TEFLON-containing surface. The average puncture force for the STF-LSR was still substantially above the neat fabric and within the variability of the puncture force on the non-coated fabric, indicating that the LSR does not significantly influence the effects of the STF within the VECTRAN.

The data demonstrated dust rejection properties of silicone coated VECTRAN were improved through a process modification consisting of an initial devolatilization step. Further improvements in the optical characteristics, dust rejection, and abrasion resistance were achieved by adding a small amount of TEFLON particles to the silicone. The thickness and TEFLON loading of the silicone were optimized and it was verified that the silicone coating was compatible with the STF treatment.

The present invention is not limited to the embodiments described and exemplified herein. It is capable of variation and modification within the scope of the appended claims.

We claim:

1. A textile with increased resistance to puncture, cutting, abrasion, and/or dust penetration, the textile comprising:
   (1) a fabric comprising a plurality of fibers comprising a tensile strength of at least about 250 MPa, wherein the plurality of fibers comprise a three-beam weave with one surface of ePTFE interwoven into a second surface of poly-(m-phenylene isophthalamide) interlaced with a poly-(p-phenylene terephthalamide) lattice or a two-beam weave with one surface of ePTFE interwoven into a second surface comprising aromatic polyester fibers produced by polycondensation of 4-hydroxybenzoic acid and 6-hydroxynapthalene-2-carboxylic acid and poly-(p-phenylene terephthalamide; and
   (2) a shear thickening fluid comprising at least one low volatility carrier fluid comprising a vapor pressure of less than about $1 \times 10^{-6}$ mPa at 25° C. in which is suspended particles having an average particle size of less than about 4,000 nm;
   wherein the particles are suspended in the low volatility carrier fluid at a concentration in the range from about 40% to about 85% by weight particles, wherein the shear thickening fluid is intercalated into the fabric, and wherein the shear thickening fluid confers to the fabric increased resistance to puncture, cutting, abrasion, and/or dust penetration as compared to an equivalent fabric that is not intercalated with shear thickening fluid.

2. The textile of claim 1, wherein:
   (a) the plurality of fibers have a tensile strength of at least about 1 GPa and a specific strength of at least about 1,500 kN*m/kg; or
   (b) the suspended particles have an average particle size of less than about 1,000 nm; or
   (c) the particles are suspended in the low volatility carrier fluid at a concentration in the range from about 60% to about 70% by weight particles; or
   any combination of (a), (b), or (c).

3. The textile of claim 1, wherein:
   (a) the particles are oxides, calcium carbonate, synthetically occurring minerals, naturally occurring minerals, polymers, titanates, carbon particles, metallic particles, zeolites, or a mixture thereof; or
   (b) the particles have an average particle size of between about 300 nm to about 700 nm and an aspect ratio of about 1:1 to about 10:1; or
   (c) the particles are oxides, calcium carbonate, synthetically occurring minerals, naturally occurring minerals, polymers, titanates, carbon particles, metallic particles, zeolites, or a mixture thereof and have an average particle size of between about 300 nm to about 700 nm and an aspect ratio of about 1:1 to about 10:1.

4. The textile of claim 1, wherein less than 2% mass is lost from the shear thickening fluid under a standard vacuum test according to ASTM standard 595 and/or NASA Standard 6001-B.

5. The textile of claim 1, wherein the low volatility carrier fluid is a hydrocarbon fluid, a fluorinated polyether, or a combination of a hydrocarbon fluid and fluorinated polyether.

6. The textile of claim 5, wherein the low volatility carrier fluid comprises a perfluoropolyether or a multiply-alkylated cyclopentane.

7. The textile of claim 1, wherein the shear thickening fluid:
   (a) increases the total weight of the textile by less than about 35% as compared to the fabric prior to intercalation of the shear thickening fluid; or
   (b) increases the total weight of the textile by less than about 20% as compared to the fabric prior to intercalation of the shear thickening fluid; or
   (c) decreases the flexural rigidity of the textile by at least about 5% as compared to the fabric prior to intercalation of the shear thickening fluid; or
   (d) a combination of one or more of (a), (b), and (c).

8. The textile of claim 1, further comprising a superhydrophobic coating disposed on a surface of the fabric, wherein the superhydrophobic coating confers to the textile improved dust penetration resistance and/or adhesion as compared to the textile without the superhydrophobic coating.

9. The textile of claim 1, further comprising a silicone coating disposed on a surface of the fabric, wherein the silicone coating further comprises particles at a concentration of about 1% wt to about 25% wt, and wherein the particles have an average particle size of between about 300 nm and about 10 μm and an aspect ratio of between about 1:1 and 10:1, and wherein the silicone confers to the textile improved dust penetration resistance and/or adhesion as compared to the textile without the silicone coating.

10. The textile of claim 9, wherein the concentration of particles is between about 2.5% wt to about 10% wt, and wherein the particles comprise PTFE.

11. A multi-layer article comprising two or more layers, wherein at least one of the layers is the textile of claim 1.

12. The multi-layer article of claim 11, wherein the multi-layer article is a safety suit or turnout gear selected from the group consisting of an extra-vehicular mobility unit, an environmental protection garment, a thermal micrometeoroid garment, firefighter turnout gear, a hazmat suit, and a fire proximity suit.

13. A multilayer article comprising a plurality of layers at least two of which are absorber layers for dissipating kinetic energy of a moving object and further comprising one or more insulating layers comprising aluminized biaxially-oriented polyethylene terephthalate, wherein one of the absorber layers is an interior absorber layer disposed within the interior of the plurality of layers and another of the absorber layers is an outer absorber layer forming an exterior layer, wherein the one or more insulating layers is disposed between the interior absorber layer and the outer absorber layer, wherein each absorber layer comprises a shear thickening fluid intercalated into a fabric comprising a plurality of fibers having a tensile strength of at least about 1 GPa and a specific strength of at least about 1,500 kN*m/kg, wherein the shear thickening fluid comprises at least one low volatility carrier fluid in which is suspended particles at a concentration in the range from about 40% to about 85% by weight, and wherein the suspended particles and shear thickening fluid remain in a flowable form after intercalation.

14. The multilayer article of claim 13, further comprising a secondary interior absorber layer, wherein the interior absorber layer is disposed between the secondary interior absorber layer and the outer absorber layer.

15. The multilayer article of claim 13, wherein the plurality of fibers are poly-(p-phenylene terephthalamide), poly-(m-phenylene isophthalamide), ultra-high molecular weight polyethylene fibers, or aromatic polyester fibers produced by polycondensation of 4-hydroxybenzoic acid and 6-hydroxynapthalene-2-carboxylic acid.

16. The multilayer article of claim 13, wherein the particles are oxides, calcium carbonate, synthetically occurring minerals, naturally occurring minerals, polymers, titanates, carbon particles, metallic particles, zeolites, or a mixture thereof, and wherein the particles have an average particle size of less than about 1,000 nm.

17. The multilayer article of any one of claim 13, wherein the low volatility carrier fluid is a hydrocarbon fluid, a fluorinated polyether, or a combination of a hydrocarbon fluid and fluorinated polyether.

18. The multilayer article of claim 13, wherein the low volatility carrier fluid comprises a perfluoropolyether or a multiply-alkylated cyclopentane.

19. The multilayer article of claim 13, wherein a superhydrophobic coating is disposed on an exterior surface of the outer absorber layer, wherein the superhydrophobic coating confers to the outer absorber layer improved dust penetration resistance as compared to an outer absorber layer without the superhydrophobic coating.

20. The multilayer article of claim 13, wherein a silicone coating disposed on an exterior surface of the outer absorber layer, wherein the silicone coating confers to the outer absorber layer improved dust penetration resistance as compared to an outer absorber layer without the silicone coating.

21. The multilayer article of claim 13, wherein the plurality of fibers comprise a three-beam weave with one surface of ePTFE interwoven into a second surface of poly-(m-phenylene isophthalamide) interlaced with a poly-(p-phenylene terephthalamide) lattice or a two-beam weave with one surface of ePTFE interwoven into a second surface comprising aromatic polyester fibers produced by polycondensation of 4-hydroxybenzoic acid and 6-hydroxynapthalene-2-carboxylic acid and poly-(p-phenylene terephthalamide).

22. The multilayer article of claim 13, wherein the low volatility carrier fluid has an vapor pressure of less than about $1\times10^{-6}$ mPa at 25° C., and wherein less than 2% mass is lost from the shear thickening fluid under a standard vacuum test according to ASTM standard 595 and/or NASA Standard 6001-B.

23. The multilayer article of claim 13, wherein the multilayer article is a safety suit or turnout gear selected from the group consisting of an extra-vehicular mobility unit, an environmental protection garment, a thermal micrometeoroid garment, firefighter turnout gear, a hazmat suit, and a fire proximity suit.

24. The multilayer article of claim 13, wherein the multilayer article is a thermal micrometeoroid garment.

25. The multilayer article of claim 13, wherein the plurality of fibers are selected from the group consisting of aramid fibers, ultra-high molecular weight polyethylene fibers, expanded/stretched polytetrafluoroethylene fibers, polyethylene terephthalate fibers, fibers made from copolymers of paraphenylenediamine and diaminodiphenyl ether, aromatic polyester fibers produced by polycondensation of 4-hydroxybenzoic acid and 6-hydroxynapthalene-2-carboxylic acid, composite textiles, and any combination thereof.

* * * * *